Dec. 3, 1968
A. I. LUSK
3,413,901
APPARATUS AND METHOD FOR INSERTING A CONTINUOUS AND SOLID
JOINT STRIP INTO PLASTIC CONCRETE
Filed March 16, 1967
10 Sheets-Sheet 1
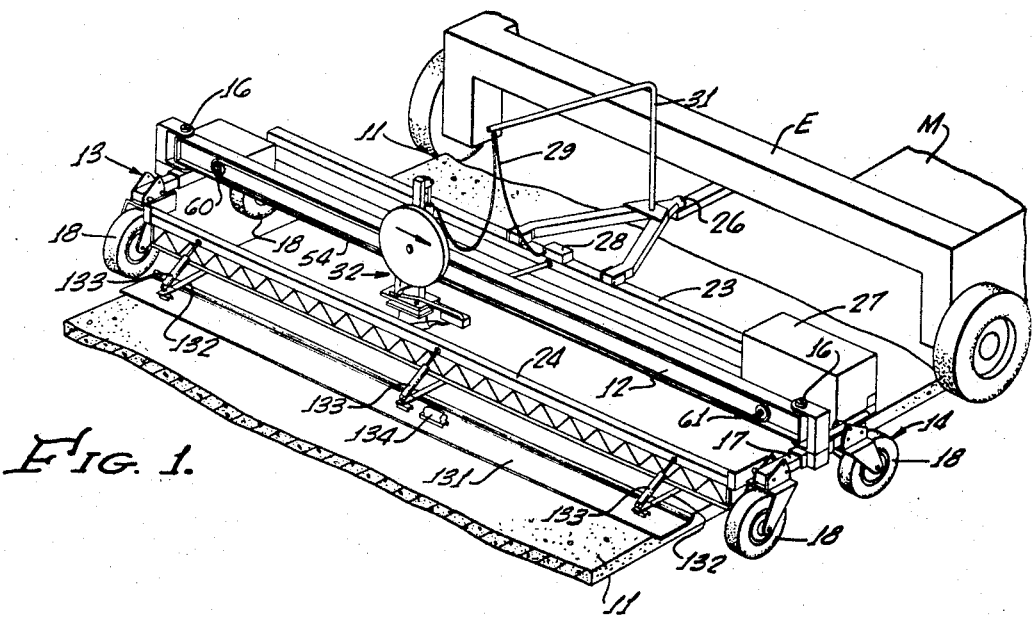
Fig. 1.
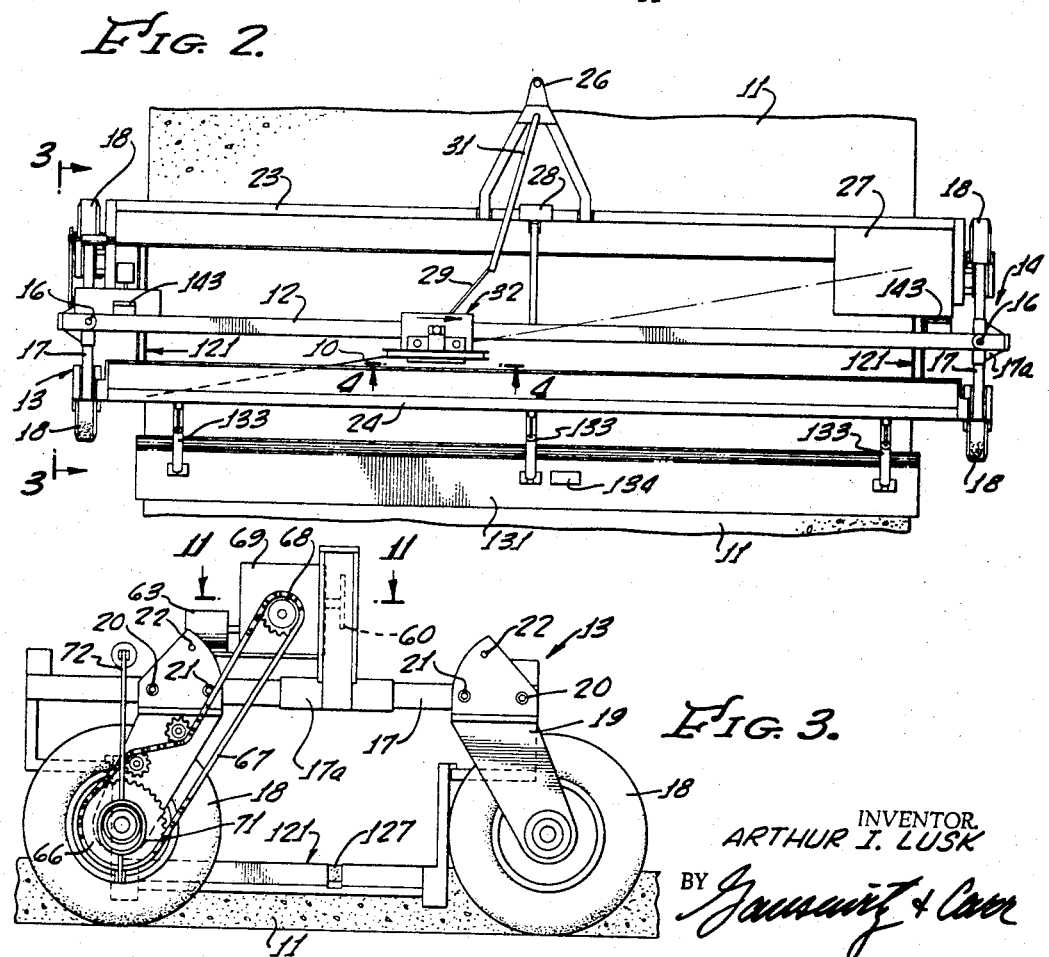
Fig. 2.
Fig. 3.
INVENTOR.
ARTHUR I. LUSK
BY *Jaumeritz & Carr*
ATTORNEYS.

INVENTOR.
ARTHUR I. LUSK
BY
ATTORNEYS.

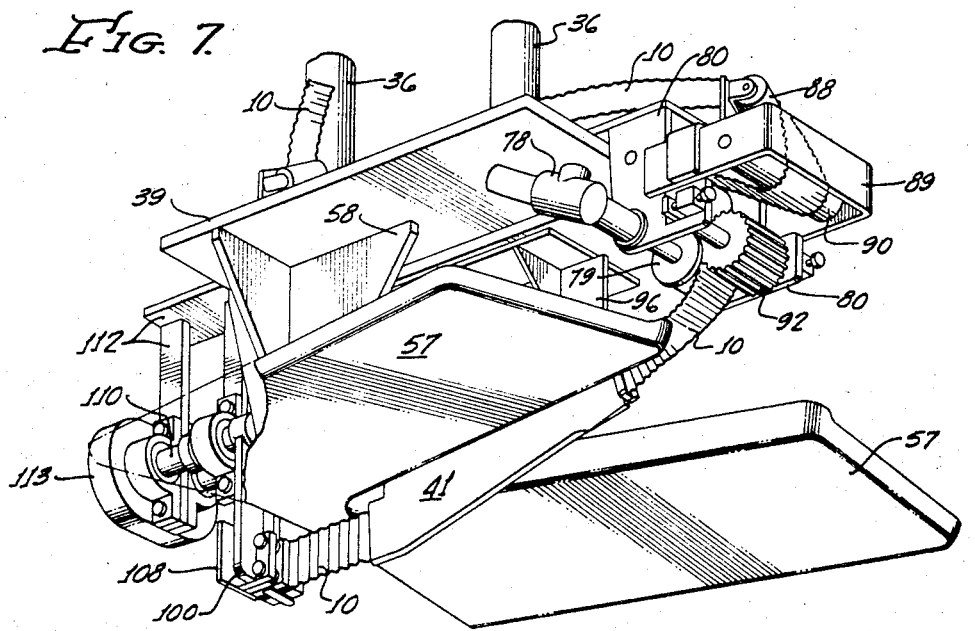
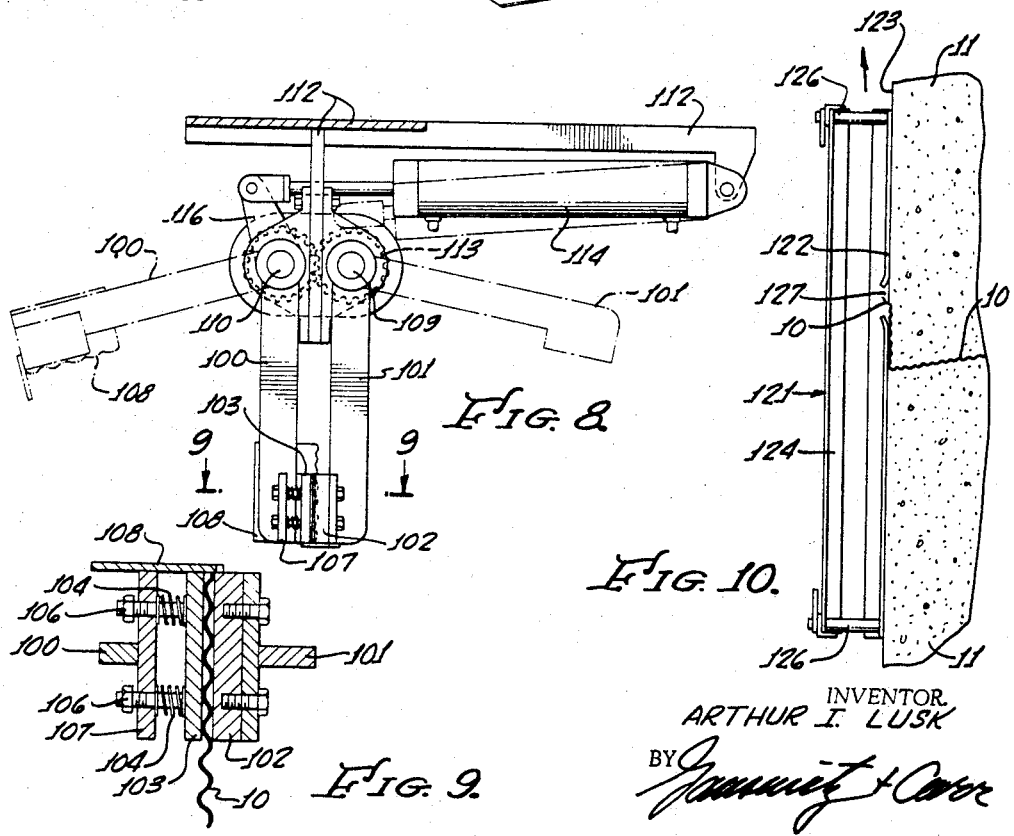

INVENTOR.
ARTHUR I. LUSK
BY
ATTORNEYS.

Dec. 3, 1968

A. I. LUSK 3,413,901

APPARATUS AND METHOD FOR INSERTING A CONTINUOUS AND SOLID
JOINT STRIP INTO PLASTIC CONCRETE

Filed March 16, 1967

INVENTOR.
ARTHUR I. LUSK
BY
ATTORNEYS.

INVENTOR.
ARTHUR I. LUSK
ATTORNEYS.

Dec. 3, 1968
A. I. LUSK
3,413,901
APPARATUS AND METHOD FOR INSERTING A CONTINUOUS AND SOLID JOINT STRIP INTO PLASTIC CONCRETE
Filed March 16, 1967
10 Sheets-Sheet 8
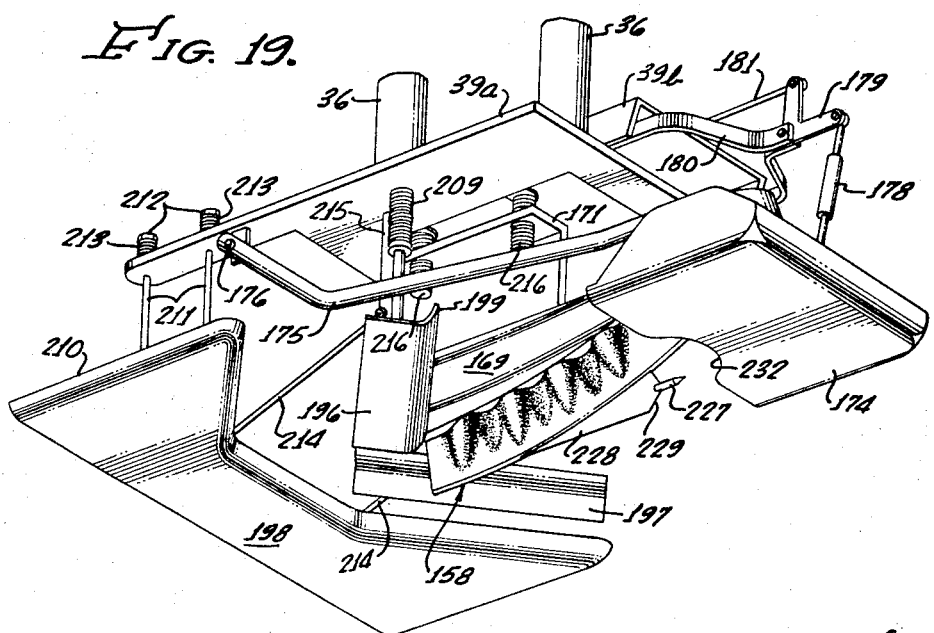
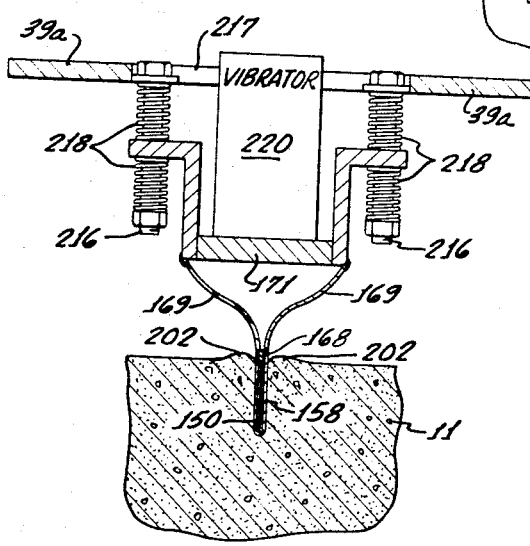
INVENTOR.
ARTHUR I. LUSK
BY
ATTORNEYS.

INVENTOR.
ARTHUR I. LUSK

BY
ATTORNEYS.

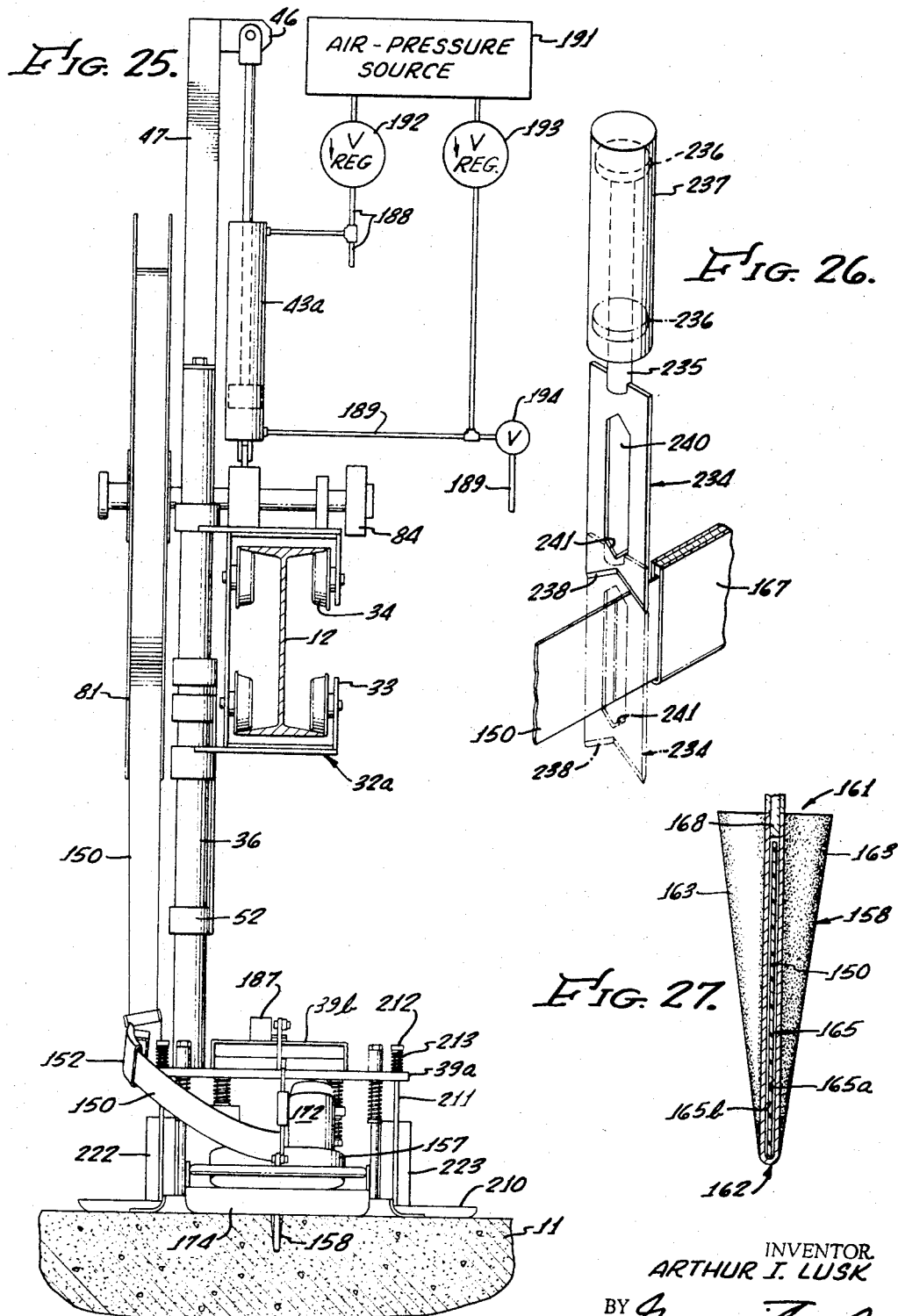

3,413,901
APPARATUS AND METHOD FOR INSERTING A CONTINUOUS AND SOLID JOINT STRIP INTO PLASTIC CONCRETE

Arthur I. Lusk, Santa Ana, Calif., assignor to Industrial Engineering Developments, Inc., Little Rock, Ark., a corporation of Arkansas
Continuation-in-part of application Ser. No. 468,381, June 30, 1965. This application Mar. 16, 1967, Ser. No. 623,638
57 Claims. (Cl. 94—39)

ABSTRACT OF THE DISCLOSURE

The present apparatus and method are particularly adapted to insert joint strips or tapes transversely of plastic concrete shortly after it has been extruded from a paving machine during formation of a concrete highway or similar elongated mass or slab of concrete. Some of the major elements or groupings (which, for convenience, will be referred to below as "features") disclosed in detail in the specification are as follows, many of such features being cosely interrelated and coacting unobviously with each other as will hereinafter be set forth in detail:

(a) Apparatus is provided which may be employed to cause the strip-insertion head to travel transversely of the highway at the same time that the entire apparatus is moved longitudinally thereof.

(b) Power-driven means are provided on the apparatus to positively feed (push) the strip in a direction opposite to the direction of traverse of the strip-insertion head, and in precisely timed relationship relative to the speed of traverse, the rate of feeding being such as to create substantially zero resultant strip speed at the point where the strip leaves the insertion head.

(c) The strip-insertion head or blade is so constructed that a flat (uncorrugated) strip or tape, which is capable of being push-fed, may be caused to change direction in a vertical plane just prior to entering the concrete. Such strip-insertion head also facilitates traverse of the blade through the concrete with minimum disturbance thereof and with maximum insertion speed. In addition, undesired ingress of grout into the blade is prevented.

(d) Sensing, height-determining, and finishing means are provided to determine the elevation of the head or blade relative to the surface of the concrete, and to fill in and finish over the groove formed in the concrete as the blade moves therethrough.

(e) Means are provided to vibrate the head or blade in a substantially vertical direction. Means are also provided to vibrate the head or blade, and selected portions of the finishing means, at different frequencies and amplitudes and for different purposes.

(f) Means are provided to cut off the strip or tape after each strip-insertion traverse, and to insure that the remaining strip end is properly located at the end of the cutting operation and during the return traverse.

(g) Slip-form means are provided at opposite edges of the highway to insure that the strip-insertion head does not break off edge portions of the plastic concrete.

Cross reference to related application

This application is a continuation-in-part of my copending application Ser. No. 468,381, filed June 30, 1965, for Apparatus and Method for Inserting a Continuous and Solid Joint Strip into Plastic Concrete, and Joints Formed Thereby, now abandoned.

Background of the invention and brief summary thereof

During a period of many decades, a vast amount of effort has been expended in attempts to form, in a practical and satisfactory manner, transverse joints between adjacent sections of a concrete highway or other concrete slab. Many types of apparatus have been invented, and have been adapted to insert an enormous variety of materials and substances into the plastic (uncured) concrete in order to create planes of weakness and thereby control the locations of the cracks formed in the concrete upon curing thereof. For example, it has been proposed to insert mastics, steel strips, paper, plastic, sand, and numerous other materials and substances into the concrete to thus form the desired planes of weakness.

Despite the great amount of activity in the indicated field, the prior-art apparatus and methods were so impractical, unworkable, expensive, inoperative and unsatisfactory that applicant knows of none which is widely employed in forming concrete highways at the present time. Instead, such highways are manufactured as continuous concrete ribbons. After the concrete has become hard, it is sawed at spaced points by means of diamond saws.

Although the art of diamond sawing is highly developed, and widely practiced, it is subject to major deficiencies in that it is extremely slow and expensive and, furthermore, requires a separate operation which must be preformed many hours after the concrete is extruded. It is emphasized that a diamond saw blade is very costly, and will last only a relatively short time. The grooves formed by such saw blades are necessarily wide, so that incompressible solid materials readily enter the grooves (cracks) and result in spalling of the concrete as the concrete thermally expands.

Even more important, however, is the fact that a large number of highways and other concrete slabs which contain such saw cuts are, nevertheless, riddled with undesired random cracks. Such random cracks appear, not only frequently but normally, in the very best of concrete freeways, expressways, turnpikes, etc., despite the presence of diamond saw cuts therein and even prior to the passage of vehicles thereof. Thus, the problem of random cracking is without doubt one of the major problems confronting the builders of concrete highways and the like.

It is emphasized that the same or similar problems relate to concrete (low grade) bases for asphalt highways and to concrete slabs, etc., of various types.

In view of the above general background, the present invention provides an apparatus and method for automatically providing joint strips or tapes transversely of the concrete extruded from a paving machine during formation of a concrete highway or the like. The strips or tapes are inserted rapidly and with minimum disturbance of the concrete. The strips thus inserted are highly effective to control cracking, yet do not weaken the concrete at regions adjacent the cracks. The widths of the grooves formed in the concrete need be no greater than is created by subsequent thermal contraction of the concrete, so that intrusion of incompressible solid material into the grooves is minimized. Accordingly, there is no spalling of the concrete before or during subsequent use to support motor vehicles.

Reference will next be made to the above-enumerated features (a) through (g), inclusive, it being emphasized that other important features are described in detail hereinafter and, furthermore, that various features (a) through (g) (and other features) interrelate or interact with each other in unobvious manners to be decribed below.

*Feature (a).*—Relative to the above-designated feature (a), prior-art apparatus for forming planes of weakness transversely of concrete highways have been entirely of the start-stop type, wherein strip-insertion occurred during a hiatus in the forward progress of the apparatus along the highway. However, as the speed of operation of the concrete extrusion apparatus increases, there will be a progressively greater need for fast-operating strip inserters which can maintain their forward travel along the highway during the traverses of the strip-insertion head thereacross. Thus, and particularly when a strip-insertion head is adapted to effect a traverse at a very high speed, there is no conceivable concrete extrusion apparatus which can operate faster than the strip inserter. Accordingly, the strip-insertion apparatus will not be a limitation on the forward speed of the extruder. The present invention provides, in at least one of its embodiments, an apparatus which can maintain forward progress along the highway at all times, this being because of the incorporation therein of elements which are timed and oriented in a predetermined manner which permits continuance of forward progress, with no disruption or "plowing" of the concrete any more than would be the case if forward progress were stopped during the strip-insertion traverses.

*Feature (b).*—Relative to the above-designated feature (b), it was common in the prior art to unroll joint strip or tape from a storage reel by anchoring one end of the tape and then permitting the tape to be unreeled or unwound from the reel in response to forward progress of the insertion apparatus along a highway or the like. However, in the case of apparatus for inserting strip transversely of the highway, this means that a clamping operation must occur prior to each strip-insertion traverse, with consequent necessity for a complex clamping mechanism and/or additional manual labor. Furthermore, the tension created in the tape as it is pulled from the reel causes stretching of the tape and also variations in the elevation thereof, it being pointed out that the stretched tape normally extends in a straight line whereas the elevation of the surface of a highway may change (as in crowned highways). When a tape is inserted into the plastic concrete in stretched condition, it tends to creep or contract after insertion, which creates problems one of which is that the tape may float upwardly out of the concrete instead of maintaining the desired injection depth.

The tendency of the tape or strip to stretch and creep is augmented by the fact that, in order to be pulled around a corner as the downwardly-traveling tape moves into the horizontal plane adjacent the surface of the highway, the tape employed was (in prior-art apparatus) necessarily relatively elastic, stretchable, etc., which type of tape has much plastic "memory" and therefore attempts to assume its original length and condition subsequent to insertion.

In accordance with the present invention, the tape is not anchored but instead is positively fed, or pushed, rearwardly out of the strip-insertion head by a drive mechanism. The rate of feed effected by the drive mechanism is precisely correlated to the rate of travel of the head relative to the concrete, in such manner that zero resultant speed is achieved. Thus, for example, if the head is moving at a rate of about one and one-half feet per second in a predetermined direction, and the tape is being fed at this same rate in precisely the opposite direction, the resultant speed of the tape (relative to the concrete) will be zero, and the tape will emerge from the strip-insertion head in a stress-free manner which eliminates the need of clamping and does not result in creep, floating, etc.

*Feature (c).*—Referring next to feature (c) specified above, it should be understood that in order to be "pushed" out of the strip-insertion head as stated in the preceding paragraphs (instead of being pulled out as was the case in prior-art apparatus), the tape employed should be capable of resisting longitudinal compression. A relatively inelastic tape is desirable because it is substantially immune to stretching, creeping, etc. A major problem relates to the bending of such a tape around a corner in a vertical plane, it being understood that the axis of the tape when moving from the reel to the concrete must necessarily extend downwardly whereas the axis of the tape when in the concrete must extend generally horizontally (parallel to the concrete surface). Reference is made to the tape "axis" because the tape itself, when in the concrete, lies in a generally vertical plane.

Applicant's first solution to this problem was to employ a special strip or tape which was pre-corrugated, the corrugations running perpendicularly to the tape axis. The tape itself was sufficiently stiff to be pushed rearwardly through the insertion head, and the corrugations permitted the necessary bending around a corner in a vertical plane. However, the amount of tape which could be stored on a reel was vastly less than the amount of uncorrugated tape which could be stored thereon, and the cost of corrugated tape was substantially more than the cost of uncorrugated tape. Furthermore, the corrugations resulted in problems relative to feeding and, in some cases, creeping—because of the fact that a corrugated tape can be stretched and compressed (somewhat) longitudinally of its axis.

Applicant's later solution to the problem of bending a strip or tape (including those which are relatively inelastic) around a corner was to provide a uniquely-shaped strip-insertion blade which corrugates or scallops portions of a flat (not pre-corrugated) tape in situ. Such strip-insertion blade or head is characterized by the presence of undulations or scallops in predetermined portions thereof, being so constructed that the tape may be pushed therethrough in a relatively frictionless manner which does not create compression or stretching of the tape. The amount of tape which may be stored on the reel is multiplied, the cost of the tape is minimized, and the problem of creeping and floating of the tape after insertion is eliminated.

Surprisingly, the same strip-insertion blade which solved the problem of turning an uncorrugated tape around the necessary corner during introduction into the concrete also produced other important advantages. These include reducing the amount of disturbance of the concrete caused by traversing the blade therethrough, reducing the power required to push the blade through the concrete, increasing the speed of traverse of the blade through the concrete, and preventing the undesired ingress of grout into the outlet end of the blade at various times during the operation (which grout would otherwise create a wearing and binding problem).

An additional surprise was that the strip or tape (not pre-corrugated) could be pushed through the head (as described above, feature (b)) with drastically less force than required to pull the tape therethrough, and with no damage to or jamming of the tape.

*Feature (d).*—Relative to feature (d) specified in the abstract of the disclosure, the problem of height control of the strip-insertion blade relative to the surface of the wet concrete is important and was very difficult of solution. It is desired that the axis of the tape be exactly parallel to the surface of the highway, which surface is frequently crowned or irregular and is formed of concrete having different characteristics. A further important problem relates to the filling in of the groove created by the blade during traverse, and the finishing over of the surface of the highway adjacent the injected tape, at a high rate of speed and without disturbing the strength characteristics of the concrete. A good surface finish must be provided which substantitially disguises the location of the tape, which finish is preferably provided without the necessity of a trailing screed. More importantly, the groove must be filled in a void-free manner and one which maintains the concrete at full strength.

The second embodiment of the present invention solves the above problems by providing a special sensing shoe in advance of the insertion blade, and by providing special finishing trowels and a float therebehind. The sensing shoe operates in conjunction with a pneumatic circuit to control precisely the elevations of the blade, and of the finishing trowels and float, relative to the highway surface. The relationship is such that the control is very precise and is characterized by the absence of hunting and by the ability to effect control even on relatively wet highway surfaces. The rate of groove filling-in, and surface finishing, can be very high, yet the structural integrity of the concrete is maintained so that spalling thereof near the resulting crack is prevented.

*Feature (e).*—Relative to feature (e) designated above, applicant has discovered that if the strip-insertion head is vibrated in a generally vertical direction and in one range of frequencies and amplitudes, and if only a certain portion of the finishing means is vibrated and in another range of frequencies and amplitudes, then the rates of strip-introduction and subsequent surface finishing are maximized while the characteristics of the concrete are also maximized. The operation is such that the aggregate is not separated from the sand and cement at portions adjacent the inserted tape, which provides the very important result of maintaining the strength of the concrete and preventing spalling as the result of major stresses created when trucks, etc., are driven over the highway.

*Feature (f).*—Relative to feature (f) specified in the abstract of the disclosure, it is important that automatic means be provided not only to cut off the transverse joint strip after each traverse, but also to precisely position and locate the remaining end (i.e., the strip end still connected to the insertion apparatus—not in the concrete) in the desired manner. The apparatus for accomplishing this must be immune to such factors as high wind, etc., and should provide a minimum amount of excess tape at each edge of the highway. Furthermore, the cutting apparatus must not jam the tape and perhaps cause binding thereof in the strip-insertion head.

In accordance with the first embodiment of the invention, applicant provided a relatively large and complex cutting and holding mechanism which performed the operation satisfactorily but which (in addition to its complexity and size) left a relatively large amount of tape adjacent at least one edge of the highway. In accordance with the second embodiment, a highly simple cutting mechanism is provided immediately adjacent the discharge end of the strip-insection head, so that the head itself maintains the tape in position during the return traverse across the highway. The cutting mechanism is so constructed that tape jamming will not result and, furthermore, is constructed in such manner that there will be very little excess tape adjacent either edge of the highway.

*Feature (g).*—Relative to feature (g) specified above, conventional concrete extruders incorporate slip forms and employ concrete which is sufficiently "stiff" that the edge portions will maintain their continuity (without permanent forms) even after the slip forms are no longer adjacent the edges. However, when a transverse strip-insertion head is entering, and especially when such head is leaving, the edge of the highway there are created stresses which may break down the edge regions adjacent the transverse strips. Accordingly, the present invention provides additional slip forms which are employed in conjunction with, and correlated to, the transverse strip-insertion apparatus in such manner that the possibility of breaking down of the edges of the highway is eliminated.

Brief description of the drawings

FIGURES 1–16, inclusive, relate to the first embodiment of the present invention. FIGURES 17–27, inclusive, illustrate the manner in which the apparatus of the first embodiment is modified in order to form the second embodiment of the invention.

FIGURE 1 is an isometric view of a first embodiment of a strip insertion apparatus constructed in accordance with the present invention;

FIGURE 2 is a top plan view of the showing of FIGURE 1, but omitting a showing of the prime mover;

FIGURE 3 is an enlarged end elevation of the apparatus, as viewed from station 3—3 indicated in FIGURE 2;

FIGURE 4 is an enlarged elevational view of the carriage and the strip-insertion head, as viewed from station 4—4 of FIGURE 2, the strip-storage reel or drum being shown in phantom in order to permit illustration of the Scotch yoke mechanism;

FIGURE 5 is a sectional view illustrating portions of the carriage and head, the section being taken on line 5—5 indicated in FIGURE 4;

FIGURE 6 is a view corresponding generally to the lower portion of FIGURE 5 but with various elements omitted in order to facilitate illustration of the apparatus for effecting vibration of the strip-insertion head;

FIGURE 7 is a perspective view illustrating the strip-insertion head, major portions of the strip-feeding means, the strip cutting and clamping means, and the troweling shoes which also aid in determining the elevation of the insertion head;

FIGURE 8 is a fragmentary sectional view, taken generally in the region indicated at 8—8 in FIGURE 4, and showing the strip-cutting and strip-clamping means in both closed and open positions;

FIGURE 9 is a horizontal sectional view on line 9—9 of FIGURE 8;

FIGURE 10 is a fragmentary plan view showing a slip-form element at one end of the apparatus, such slip-form element being further adapted to clear from the paths of the tires excess concrete left by the extruder;

FIGURE 11 is a schematic sectional view, taken generally at line 11—11 of FIGURE 3, illustrating additional portions of the means for driving the carriage in timed relationship to the forward progress of the apparatus along the highway;

FIGURE 12 is a fragmentary vertical sectional view, taken on line 12—12 of FIGURE 5, showing the overrunning or one-way clutch incorporated in the drive for the joint strip;

FIGURE 13 is a vertical sectional view, taken generally on line 13—13 of FIGURE 4, showing the joint strip as it moves through the injector head;

FIGURE 14 is a sectional view of a completed joint, including the joint strip and the crack therebeneath;

FIGURE 15 is a view schematically illustrating the pneumatic circuit which associates an air pressure source with the head-supporting means, the strip cut-off and clamping means and the brake for the drum;

FIGURE 16 is a horizontal sectional view taken on line 16—16 of FIGURE 5 and indicating in phantom lines the location of the beam or track;

FIGURE 17 is a side elevational view which corresponds to the lower portion of FIGURE 4 but which illustrates an improved strip-insertion head or blade and related sensing and finishing means, forming the second embodiment of the present invention;

FIGURE 18 is a front elevational view of the showing of FIGURE 17;

FIGURE 19 is an isometric view of the strip-insertion head and related apparatus, corresponding generally to FIGURE 7 but showing the second embodiment instead of the first;

FIGURE 20 is a fragmentary vertical sectional view which corresponds generally to FIGURE 6 but illustrates the second embodiment, the vibration means for the strip-insertion blade or head being shown schematically;

FIGURE 21 is a fragmentary horizontal sectional view on line 21—21 of FIGURE 17, showing the control means for the fluid cylinder which controls the height of the blade and the associated apparatus;

FIGURE 22 is a fragmentary sectional view on line

Figure 5:
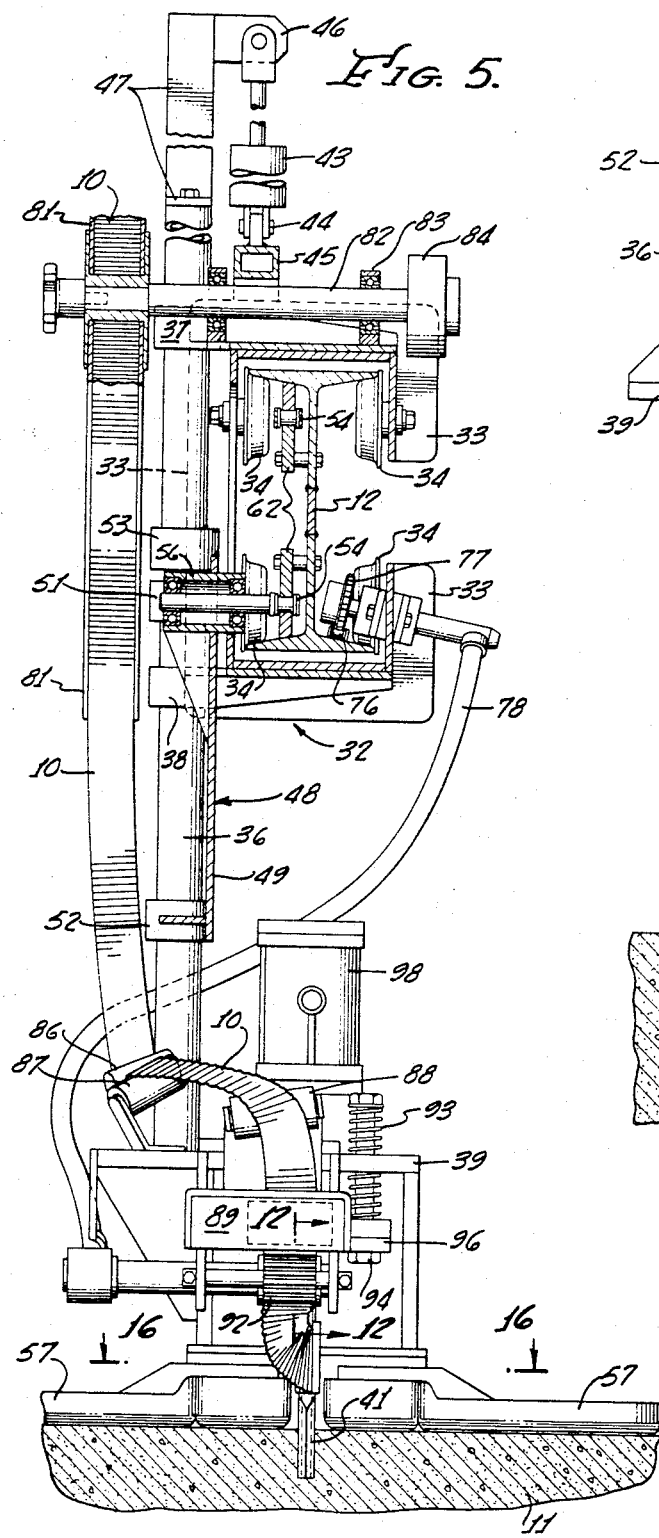
Figures 17, 18:
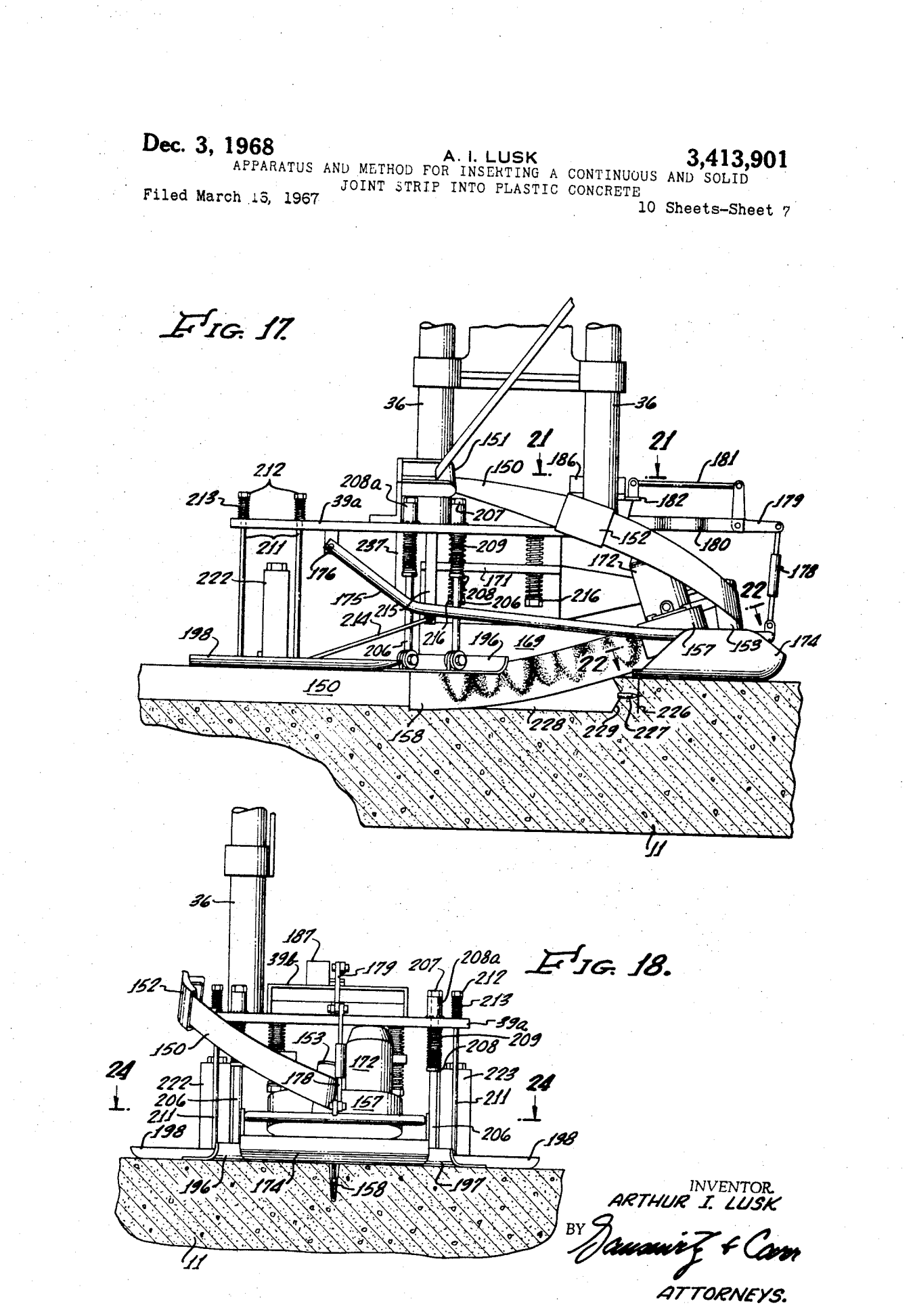
Figure 23:
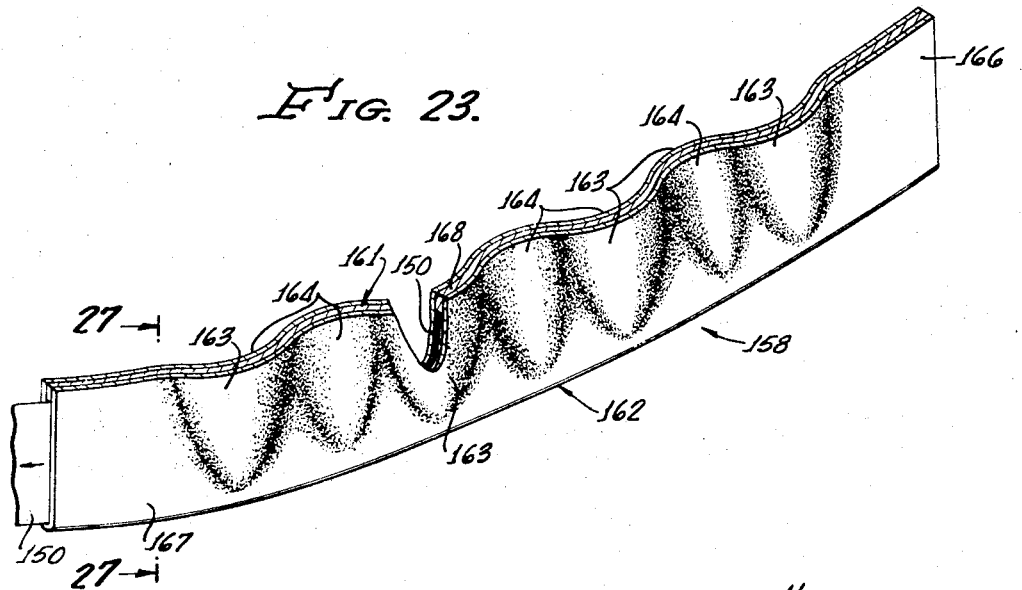
Figure 24:
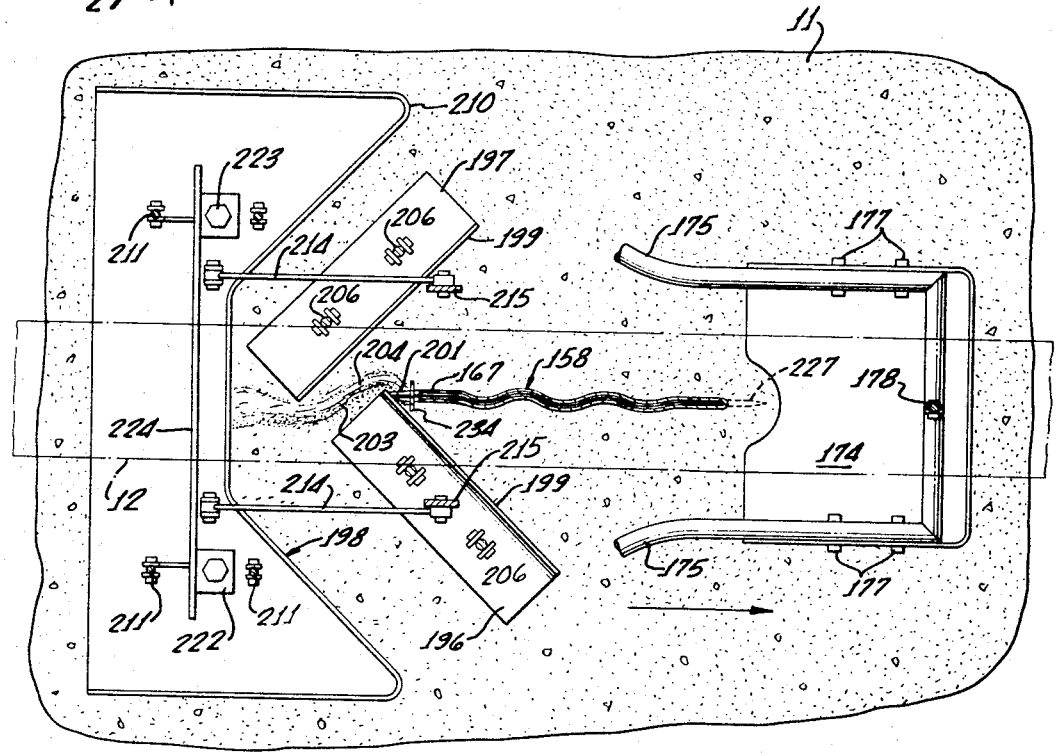

22—22 of FIGURE 17, showing the positive feed means for the uncorrugated joint strip;

FIGURE 23 is an isometric view illustrating the strip-insertion head or blade of the second embodiment;

FIGURE 24 is a horizontal sectional view taken generally along line 24—24 of FIGURE 18;

FIGURE 25 is a view corresponding generally to FIGURE 5 but showing the second embodiment, portions of the apparatus shown in FIGURE 5 being omitted from FIGURE 25;

FIGURE 26 is a fragmentary isometric view of the tape-cutting means of the second embodiment; and FIGURE 27 is an enlarged sectional view of the strip-insertion head, taken at line 27—27 indicated in FIGURE 23.

DESCRIPTION OF THE FIRST EMBODIMENT, FIGURES 1–16, INCLUSIVE

The present apparatus and method will be described as employed in inserting a solid joint strip or tape 10 into a highway or road 11 formed of plastic (wet and uncured, but normally a relatively "stiff" mix) concrete. It is to be understood, however, that the apparatus and method may be employed relative to other concrete slabs, for example the floors of buildings, the supports or substrates for asphalt highways, etc. Thus, use of the term "highway" in the appended claims is not to be interpreted as limiting the scope of such claims.

Preferably, the present apparatus is located immediately to the rear of the concrete extruder (including slip forms) used in highway construction. Although the apparatus will be described herein as connected to and thus propelled by the extruder apparatus, it is strongly emphasized that the apparatus may be self propelled as by providing suitable drive means for at least one wheel. An extruder apparatus, or other prime mover, is indicated schematically at E in FIGURE 1, having an engine schematically shown at M.

Stated in a general manner, the present apparatus comprises a bridge which spans the highway 11 and is adapted to be propelled longitudinally thereof, such bridge carrying a carriage adapted to insert a transverse joint strip into the plastic concrete forming the highway. The apparatus further comprises means to drive the carriage transversely of the higway in timed relationship to the speed of the bridge longitudinally of the highway, the result being that the strip may be inserted to form a transverse joint without at any time stopping the forward movement of the bridge along the highway. Additionally, the apparatus comprises means to regulate automatically the height of the strip-insertion head relative to the upper surface of the concrete, so that variations in the elevation of such upper surface will not alter the degree of insertion of the strip into the concrete.

In accordance with another important feature of the apparatus, means are provided to drive the insert strip in timed relationship to the movement of the bridge longitudinally of the highway, and to the movement of the carriage transversely thereof. Such means effects pushing of the strip into and through the strip-insertion head, the result being that there is little or no stretching and consequent creeping of the strip, and no need for any anchoring of the strip at any time. The strip or tape is continuous, being cut (after insertion) at a point adjacent the edge of the highway by an automatic cutting and holding means provided on the apparatus.

An important feature of the first embodiment resides in the joint strip itself, and in the joint formed in the concrete after the strip is inserted therein. The strip is corrugated in a direction perpendicular to the longitudinal strip axis, so that the corrugations are vertical after the strip is inserted into the concrete. The corrugated strip combines with the strip-feeding means during pushing (as distinguished from pulling) of the strip out of the insertion head. Thus, for example, the use of the corrugated strip permits the strip to be turned from a downwardly-inclined orientation to a horizontal orientation in a space sufficiently short that there will be insufficient friction to cause the strip to bind in the insertion head.

The resulting joint formed at each strip upon curing and aging of the concrete has been found to include a highly desirable crack beneath the full length of the strip, and in the complete absence of cracks between adjacent strips. Thus, the need for sawing of the concrete is eliminated.

Proceeding first to a description of the moving bridge, this is illustrated to comprise a main span or track portion 12 the ends of which connect with truck portions 13 and 14 which move along the ground adjacent each edge of highway 11. The illustrated track or span 12 comprises an I-beam the ends of which are pivoted at pintles 16 to the frames of trucks 13 and 14. Such truck frames are substantially identical to each other, and each comprises a horizontal element 17 along which a sleeve means 17a (which supports pintle 16) is adapted to be adjusted through a limited distance. Two wheels 18 are provided on each truck, one below each end of the frame element 17. Such wheels are rotatably mounted in bifurcated brackets 19 which are pivoted at 20 to the frame ends. Such brackets are locked, at one of several desired pivoted positions, by means of bolts 21 which extend through holes in the frame.

Referring particularly to FIGURE 3, the truck 13 is shown in its normal position, with the wheels 18 (which are preferably provided with pneumatic tires) resting on the roadbed adjacent the edge of highway 11. By removing the illustrated bolts 21 and re-inserting them in holes 22 and through the frame ends, the brackets 19 may be pivoted about points 20 to lower the associated beam end through a predetermined distance. Such distance is equal to the thickness of a conventional highway 11. Lowering of one of the ends of the beam relative to the wheels may be effected, for example, when a second strip of highway 11 is to be laid adjacent a previously formed and cured highway. In such a situation, the elevated wheels (and thus lowered beam) ride on the previously cured highway strip instead of on the roadbed adjacent the highway.

Shifting of sleeve means 17a effects a precise or vernier adjustment of the angle of beam 12 relative to the longitudinal axis of the highway, for purposes to be described hereinafter. Means, not shown, are provided to lock sleeve means 17a at any adjusted position on element 17. It is to be understood that various other adjustment means may be provided. Thus, for example, means (not shown) are provided to raise and lower each pintle 16 through any desired distance, in order to adjust the elevation of the beam or track 12 above the surface of highway 11.

In the illustrated embodiment, the portion of the apparatus spanning the wet concrete 11 comprises not only the main span or track 12 but also forward and rear spans 23 and 24 which are suitably connected, respectively, to the forward and rear ends of the horizontal frame elements 17. Thus, elements 17 and 23–24 form a rigid rectangular frame. Elements 23 and 24 remain generally parallel to beam 12 at all times, including during and after vertical adjustment of wheels 18 as described above relative to FIGURE 3. Both of such spans 23 and 24 may support catwalks and other apparatus, some of which will next be described.

Forward span 23, in the illustrated embodiment, has connected thereto a drawbar 26 adapted to be pivotally connected to the associated extruder E. Mounted at one end of the forward span is a source of power which is indicated schematically at 27. Such power source may comprise, for example, a gasoline engine (not shown) adapted to drive an air compressor (not shown) and also a hydraulic pump (not shown) to thus supply the requirements of the apparatus for air and hydraulic fluid under pressure. In addition, the power source 27 may comprise a generator driven by a gasoline engine, and serving to provide electrical power adapted to be employed for purposes such as remote control of various devices.

The air compressor connects to the interior of the forward span 23, which is formed of tubing adapted to contain air under pressure. Air from such span interior (which serves as an air receiver) passes through a master air-control valve 28 (FIGURE 1) and flexible hose 29 to pneumatic apparatus on the carriage. Such hose is illustrated as being hung on a pivotally-mounted angle bar 31 adapted to support the hose as the carriage moves back and forth between the ends of track 12. The forward span (air receiver) 23 is connected, through a suitable pipe (not shown), with the rear span 24 (also formed of tubing) to charge the same with air. As will be indicated hereinafter, air may thus be bled from such rear span for operation of equipment such as vibrators and the like.

Figure 4:
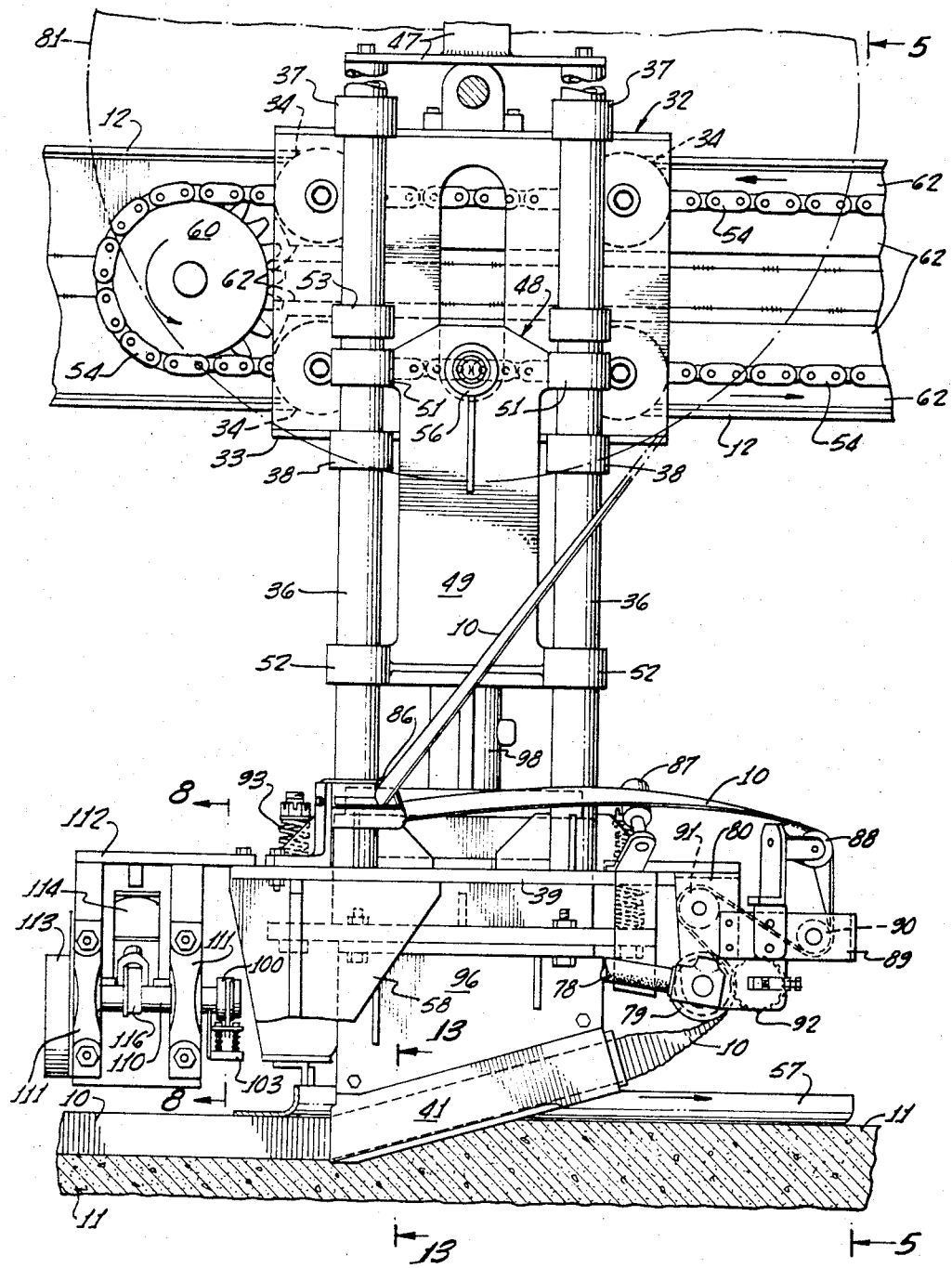

Proceeding next to a general description of the carriage, which is denoted generally by the reference numeral 32, this is best illustrated in FIGURES 4 and 5 to comprise a generally C-shaped frame 33 on which are mounted eight rollers 34. Four of such rollers ride on the lower surface of the upper flange of the I-beam 12, on opposite sides of the web thereof, whereas the remaining four rollers are supported on the upper surface of the lower flange. Thus, the carriage 32 may be driven along track 12, in a relatively frictionless manner, due to operation of drive means to be described hereinafter.

Mounted in vertically-movable and parallel relationship on carriage 32 are tubular shafts or connectors 36. Such shafts extend slidably through an upper set of bearings 37 and a lower set of bearings 38, such bearings being mounted, respectively, on the upper and lower portions of the C-shaped frame 33. The lower ends of the shafts 36 connect rigidly to a horizontally-disposed support plate 39 for various major components of the apparatus, including the previously indicated strip-insertion head, which is shown at 41.

Shafts 36, and thus the support plate 39 and connected apparatus, are supported and vertically moved in response to the conjoint action of three means next to be described. The first such means is a pneumatic cylinder 43 the lower end of which is pivotally connected at 44 (FIGURE 5) to a bracket 45 on frame 33. The upper end of cylinder 43 is pivotally connected to a lug 46 on a yoke 47 to which the upper ends of both shafts 36 are bolted or otherwise secured. Thus, introduction of air under pressure into the lower end of cylinder 43 operates to extend the same and thereby lift yoke 47 and the connected shafts 36 and support plate 39.

The second of the indicated means for moving the shafts 36 vertically is a Scotch-yoke mechanism 48. Such mechanism comprises a generally rectangular and vertically-oriented plate 49 having at the upper corners thereof upper bearing portions 51 which are located above the bearings 38 and which receive, respectively, the shafts 36. Provided at the lower corners of plate 49 are lower bearing portions 52, such bearing portions also receiving the shafts and being disposed below the bearings 38.

Plate 49 and the bearings thereon cooperate with collars 53 which are rigidly mounted on shafts 36 above bearing portions 51. Thus, upon elevation of plate 49 until the upper surfaces of bearing portions 51 engage collars 53 such collars and the shafts 36 will be elevated. It is to be remembered, however, that the force required to effect such elevation is determined largely by the amount of pressure in cylinder 43 (FIGURE 5).

The indicated upward movement of the plate 49, and subsequent downward movement thereof, are effected by a drive chain 54 mounted longitudinally of the span or track 12 and which serves to shift the carriage 32 longitudinally of the track to traverse the highway 11. Plate 49 is connected to drive chain 54 by means of a master link 56 which is preferably, as shown in FIGURE 5, associated with the plate 49 by means of suitable ball bearings.

The remaining of the above-indicated three means for vertically moving the shafts 36 and apparatus supported thereby comprises large shoes or floats 57 adapted to be supported on the upper surface of the plastic concrete 11. Such shoes or floats 57 are directly mounted to the support plate 39, for example by means of the indicated brackets 58 (FIGURE 7).

As will be stated in greater detail hereinafter, the amount of air pressure in pneumatic cylinder 43 (FIGURE 5) is correlated to the weight of the shafts 36 and apparatus supported thereby, and also to the characteristics of the plastic concrete 11, in such manner that the shoes 57 will float on the concrete and will automatically adjust the height of the support plate 39 (and thus strip-insertion head 41) in accordance with the elevation of the upper concrete surface. Thus, it is insured that the strip 10 will be inserted a predetermined desired distance into the concrete, despite irregularities in the upper surface and despite factors such as the inclined nature of such upper concrete surface (for example, in the case of crown-type highways).

At the end of a strip-insertion traverse of the carriage, the master link 56 is elevated as the associated portion of drive chain 54 is elevated by one of the sprockets therefor. Thus, and particularly if the pneumatic pressure in cylinder 43 is then increased as will be described, the upper bearing portions 51 on plate 49 bear against collars 53 and lift shafts 36 until the strip-insertion head 41 is spaced above the concrete, the apparatus then being in condition for a return traverse to the opposite side of the highway.

It is to be understood that the collars 53 may be suitably adjusted on shafts 36 (for example, by means of locking devices associated therewith) to permit a desired degree of upward and downward movement of the shafts 36 and the head 41.

Figure 16:
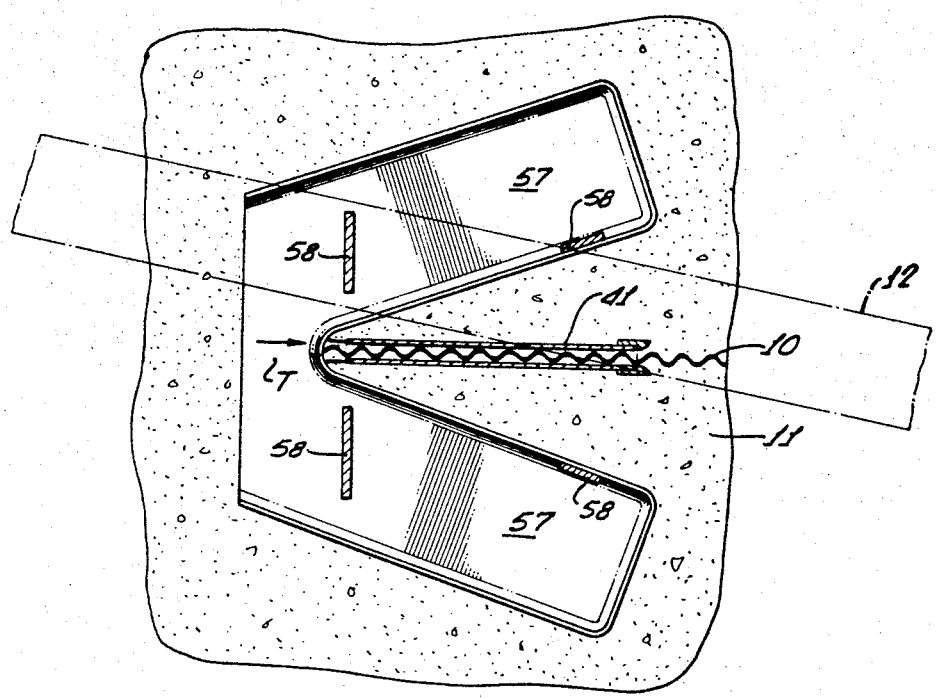

The apparatus for effecting vertical movement of the shafts 36 and associated strip-insertion head 41 achieve more than one purpose. Thus, the shoes or floats 57 are so oriented (as best shown in FIGURE 16) that they will effect smoothing or troweling of the region of the plastic concrete into which the strip 10 has been inserted. Stated more definitely, the shoes or floats have portions disposed directly to the rear of (and aligned with) the strip-insertion head. Also, as above noted, the Scotch-yoke mechanism 48 and associated drive chain 54 not only effect vertical movement of the shafts and head, but also effect horizontal movement thereof along the span or track 12.

It is a feature of the described mechanism for raising and lowering the shafts 36 (and connected head 41 and other apparatus) that the vertical movement at each end of the traverse is characterized by substantially uniform acceleration (and deceleration). The acceleration is controlled by the Scotch-yoke mechanism 48 which, for reasons known in the mechanical arts, is a constant-acceleration device. Such constant acceleration, and the associated force exerted by pneumatic cylinder 43, effect a smooth raising or lowering of the head at each end of the traverse, without excessive mechanical shock and without substantial strain on the drive chain 54 and associated sprockets and other parts.

*Detailed description of "feature (a)" specified in the abstract of the disclosure*

There will next be described the means for driving the chain 54 and thus the carriage 32 and head 41 in precisely timed relationship to the movement of the apparatus longitudinally of highway 11. Such drive chain 54 is mounted between a drive sprocket 60 and an idler sprocket 61 (FIGURE 1) which are located at opposite end portions of beam 12. Both runs of the chain 54 are guided, at points between sprockets 60 and 61, by means of suitable chain guides 62 (FIGURES 4 and 5). Such chain guides may be of conventional construction, being mounted on the web and flange portions of the I-beam track 12 as best shown in FIGURE 5.

The means to drive the sprocket 60 in timed relation to the forward movement of the wheels 18 of the apparatus may comprise, for example, an electric (or hydraulic, etc.) motor which is connected by reduction gears (not shown) to wheels 18 to drive the same, and is also connected by reduction gears to sprocket 60 to drive it and thus the associated chain 54 and carriage. With such an arrangement, the device is self-propelled, as above noted, no drawbar 26 and prime mover E (FIGURE 1) then being required. The gear ratios are so related to each other that the strip-insertion head 41 traverses the plastic concrete 11 without "plowing" the same, as will be set forth hereinafter.

Figure 11:
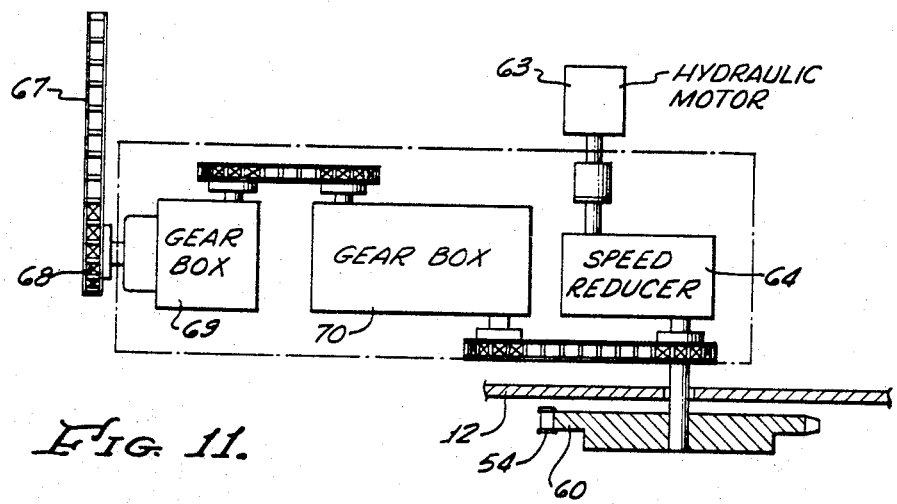

In the illustrated apparatus, the drive for sprocket 60 and thus chain 54 comprises a hydraulic motor 63 (FIGURES 3 and 11) which is connected by suitable piping, not shown, to the above-mentioned hydraulic pump contained within power source 27. Such motor is connected to sprocket 60 through suitable speed-reducer means indicated at 64 (FIGURE 11). One of the wheels 18 (FIGURE 1) then being required. The gear ratios are so re-slipping) manner to be described hereinafter. The wheels 18 are turned due to pulling of the apparatus by prime mover E (FIGURE 1).

Because the relationship between sprocket 60 and wheel 18 (FIGURE 3) is fixed, the speed of operation of the sprocket is controlled by the speed of rotation of the wheel 18 (which may be termed the timing wheel). Thus, the hydraulic motor 63, operating as a booster, does not control the speed of the sprocket 60 but does operate to supply power thereto under the timing control of the wheel 18 and associated mechanism. The hydraulic motor 63 may have associated therewith a bypass means (not shown) to bypass hydraulic fluid during periods when the wheel 18 is stopped or moving relatively slowly.

As shown in FIGURE 3, the hub portion of timing wheel 18 has mounted thereon a sprocket 66 around which is extended a timing chain 67. Such chain extends adjacent suitable idler sprockets to a sprocket 68 which is connected to a gear box 69. As shown in FIGURE 11, gear box 69 is connected by a drive chain to second gear box 70 which, in turn, is connected by suitable sprockets and an additional drive chain to the shaft of sprocket 60.

A clutch mechanism 71, operated by a handle 72 (and/or by a piston), is provided at the hub of timing wheel 18 (FIGURE 3) and is selectively operable to connect and disconnect the sprocket 66 relative to such wheel. When clutch 71 is engaged, the timing wheel 18 operates through timing chain 67 to positively control the speed of operation of gear-box means 69 and 70 and thus the speed of driving of the sprocket 60, chain 54 and carriage 32. When clutch 71 is disengaged, the sprocket 60 and chain 54 are driven by the hydraulic motor 63 at an untimed speed. It is to be understood that the last-mentioned mode of operation is not normally employed, the purpose of the clutch 71 being to disengage sprocket 60 from the timing chain 67 when it is desired to move the apparatus along the highway without inserting joint strip therein (for example, during initial orientation and setup of the apparatus). Suitable valve means (not shown) may be provided to cause hydraulic motor 63 to cease operating when desired.

As an example of the way that the various drives may be related or timed, let it be assumed that the desired forward speed of the apparatus along the highway is approximately eight feet per minute (it being understood that the speed may be much greater). The gearing is then so constructed and related that the speed of driving of chain 54 by sprocket 60 will be on the order of forty-eight feet per minute. The joint strip will then be inserted into the concrete along a line which is at an angle relative to a perpendicular to the longitudinal axis of the highway) of about nine and one-half degrees. To accomplish this result, and to prevent undesired plowing of the concrete by the strip-insertion head 41, such head is canted relative to a perpendicular to the longitudinal highway axis at the same angle (approximately nine and one-half degrees).

Fine or vernier adjustments of the angle of strip insertion are effected by shifting one or both ends of the beam or track (span) 12 forwardly or rearwardly, so that the beam 12 is itself at an angle, relative to the longitudinal axis of the highway, which is somewhat different from ninety degrees. Such movement is permitted because of the presence of the pintles 16, and because the frame portions 17a (FIGURE 3) may be adjusted longitudinally of frame elements 17 as stated heretofore.

To amplify upon the above, it is pointed out that the strip-insertion head 41 is an elongated, narrow element which (when viewed from above) is oriented at an acute angle relative to the longitudinal axis of the beam or track 12 from which it is movably supported. This is best shown in FIGURES 2 and 16, wherein the track 12 is shown as generally perpendicular to the highway axis and the head is at an angle (for example, about nine and one-half degrees) to the track. It is also possible to cause the track to be oblique to the highway axis, and the head perpendicular thereto. Various other angles may be employed, so long as the relationship stated in the following paragraph is adhered to.

To compute (during manufacture of the apparatus) the angle of the head 41 relative to track or beam 12 (when such elements are viewed from above), it is necessary to determine the vector sum of the speed of the apparatus along the highway and the speed of the carriage along the track (the latter speed being fixedly related to the former because of the described drive relationships). The head is then oriented parallel to the resultant found by such vector addition.

With the described construction, the strip-insertion head moves longitudinally and smoothly through the concrete and forms only a narrow groove which is readily and automatically covered by the troweling shoes 57. Such shoes extend over the indicated groove (which contains joint strip 10) as best shown in FIGURE 16. If the described vector relationship were not adhered to, the head would tend to plow (and thus greatly disturb) the concrete by moving laterally instead of purely longitudinally.

*Detailed description of "feature (b)" (first embodiment) specified in the Abstract of the Disclosure*

In addition to the drive chain 54 which is mounted on one side of the web of beam or track 12, there is mounted on the other side of such web a stationary chain 76 (FIGURE 5) which forms part of the feeding mechanism for insert strip or tape 10. The chain 76 is suitably mounted on the upper surface of the lower flange of the I-beam 12, and has meshed therewith a sprocket 77 which is rotatably mounted on the C-frame portion 33 of carriage 32.

The sprocket 77 is connected through a suitable flexible drive 78 with a feed roller 79 (FIGURES 4, 7 and 12) which is rotatably supported on the support plate 39. Stated more definitely, the shaft of the feed roller 79 is mounted in suitable brackets 80 (FIGURE 7) which depend from an extension of the support plate.

The joint strip 10 is thus fed in response to operation of the elements 77 and 79, as element 77 moves along the stationary chain 76. Such feeding is in perfect timed relationship to the speed of movement of the carriage 32 as it traverses the highway 11 (and also in perfect timed relationship with the forward movement of the entire apparatus along the highway).

Joint strip 10 is fed from a storage roll thereof, such roll being provided on a large reel or drum 81 (FIGURE 5) having a horizontal axle or central shaft 82 which is rotatably supported in ball bearings 83 provided on the upper surface of C-frame 33.

At the end of a strip-insertion traverse across the highway 11, the reel 81 has considerable rotational inertia. Nevertheless, such reel is rapidly stopped by operation of a pneumatic brake which is schematically represented at 84. Such brake incorporates a stationary housing which is fixedly mounted on C-frame 33, and further incorporates means (in the nature of clutch discs) which are responsive to application of air pressure to stop rotation of shaft 82 and thus of the reel or drum 81.

As is best illustrated in FIGURES 4, 5 and 7, the joint strip 10 after leaving reel 81 passes under a first idler roller 86 on support plate 39, thence over a second idler roller 87 thereon, and thence over a third idler roller 88. Thereafter, the strip passes downwardly into a U-shaped bracket 89 having a fourth idler roller 90 rotatably mounted therein, following which the strip passes upwardly over a fifth idler roller 91 and thence downwardly between the feed roller 79 and a sixth idler roller 92. Roller 92 is adjustably mounted adjacent the feed roller 79 and serves as the back-up or compression roller therefor. In the illustrated embodiment, the back-up idler 92 is shaped as a gear (FIGURE 12) in order to mesh with the joint strip 10 which is corrugated as will be described. Drive roller 79 may be correspondingly gear shaped, or may (for example) be formed of soft rubber and have a relatively smooth surface.

From the feed roller 79 and its associated back-up roller 92, the joint strip 10 is fed into the forward end of head or blade 41, and thus is pushed through such head and out the rear end thereof into the soft concrete 11 as shown in FIGURE 4. Stated more definitely, the strip is pushed rearwardly into the groove formed in the concrete by head 41. It is emphasized that such pushing or expelling of the solid joint strip 10 from the head 41 is markedly different from prior-art constructions wherein the joint strip was first anchored in the concrete and then pulled from the apparatus in response to movement thereof. The present apparatus, wherein the joint strip is pushed out of the head, eliminates the necessity for any anchoring operation and thus makes it practical to achieve such benefits as automatic cutoff of strip sections from a continuous roll (as distinguished from the use of individual and pre-cut strip lengths).

A major benefit achieved by the invention is that the joint strip 10 (where in head or blade 41, and in the concrete) is never pulled and thus stretched. Such stretching is disadvantageous in that the strip then tends to contract ("creep"), which disturbs the concrete in which the strip is embedded.

The relationship between sprocket 77 (FIG. 5) and the feed roller 79 is so selected that the joint strip 10 will be fed at the same rate of speed as (but in opposite direction to) the resultant speed achieved by the head 41 as it traverses the highway. Because of the above-described vector relationships, such resultant speed is greater than the speed of the head relative to the track. Thus, there is no relative movement between the joint strip (at the portion thereof which enters the highway) and the concrete highway 11. The timed relationship is preferably caused to be so precise that, even if the carriage were merely traversed over the ground as distinguished from over wet concrete, the joint strip 10 would be laid down on the ground and would not be pulled therealong.

*Detailed description of the strip-insertion head or blade (first embodiment)*

As best shown in FIGURES 4, 7, 13 and 16, the head or blade 41 comprises an elongated channel which is disposed in a vertical plane and, preferably, has a relatively sharp and closed bottom edge adapted to knife into the plastic concrete. The upper portion of the channel should also be closed, as illustrated. The channel is sufficiently large to loosely receive the joint strip, without bending the same. The entire length of the passage through the channel is straight.

As stated in detail above, the vertical plane in which the head 41 is disposed is not parallel to the track or I-beam 12 but is, instead, somewhat oblique thereto (FIGURE 16) by an angle which is related to the degree of forward progress of the entire apparatus along the highway as the carriage traverses the same.

As shown in FIGURE 4, head 41 is inclined downwardly and rearwardly at an angle sufficient to cause the forward end of the head to be spaced substantially above the upper surface of the concrete, and the rearward end of the head to be disposed below the surface of the concrete by a distance corresponding generally to the vertical dimension of the joint strip 10. In the illustrated embodiment, the angle of inclination of head 41 relative to a horizontal plane is on the order of fifteen to twenty degrees, but certain other angles may be employed.

It is a feature of the first embodiment that the joint strip or tape 10 is corrugated in such manner that the corrugations are substantially vertically oriented when the joint strip is embedded in the concrete, as illustrated at the left in FIGURE 4. Because the joint strip is corrugated, it may be formed of a material which is sufficiently rigid and slippery to be readily fed into and through the head 41, without at any time binding, while still being able to turn the corner (illustrated as approximately fifteen to twenty degrees) at the rear end of the head and as the strip discharges therefrom. Such angular movement of the joint strip, while lying at all times in a vertical plane, is accompanied by a stretching of the corrugations at the lower edge of the joint strip, and by compression of corrugations at the upper edge thereof.

The axes of the feed roller 79 and the associated backup roller 92 are disposed parallel to each other and in a horizontal plane. Furthermore, such roller axes are generally perpendicular to the vertical plane containing head 41. Thus, the joint strip 10 must twist through approximately a ninety-degree angle in passing between feed roller 79 and the inlet end of head 41. Such ninety-degree twist is readily made, without decreasing the ability of the feed roller 79 to push the joint strip into and through the head 41, because of the corrugated nature of the joint strip.

As a specific example, the joint strip is preferably a cheap material such as polystyrene plastic, being preferably approximately 0.020 inch or 0.025 inch thick. The vertical dimension of the joint strip should be on the order of 20 to 25% of the thickness of the concrete. Thus, in a concrete highway 9 inches thick, the joint strip may have a vertical dimension of approximately 2 inches. The distance between the parallel planes containing the apex portions of the joint strip (opposite sides thereof) may be, for example, on the other of ⅛ inch.

*Description of the head-vibration means (first embodiment)*

It is an important feature of the present method and apparatus that the head or blade 41 is vibrated vertically, in a predetermined manner, during the entire time the joint strip 10 is inserted into the concrete. For this purpose, and referring particularly to FIGURE 6, the head 41 is not mounted directly to the support plate 39 but instead is associated therewith through suitable suspension and vibration-isolation helical compression springs indicated at 93. Such springs are mounted around the shanks of bolts 94, and bear against the upper and lower surfaces of support plate 39. The clearance holes in plate 39 for such bolts 94 are sufficiently large that there will be no direct contact between the bolts and the plate.

Bolts 94 connect at their lower ends to a bracket 96 to the lower edge of which the head 41 is attached. Such bracket 96 further includes an upwardly-extending portion 97 which passes through a clearance slot in support plate 39 and supports at the upper end thereof a vibrator element 98 adapted to effect vertical vibration of the associated bracket and thus of head 41.

The illustrated element 98 is a piston-type vibrator having a vertically-oriented piston adapted to travel back and forth through a distance on the order of 1/8 inch, in response to pneumatic actuation. The speed of vibration is preferably on the order of 3600 cycles per minute.

In the described manner, the vibrator 98 effects rapid vertical vibration of head 41 but not of the plate 39 and associated portions of the carriage. The vibration is very important in causing the head 41 to move smoothly through the plastic concrete 11, and to displace aggregates away from the path of the head, without at any time causing plowing, upsetting, or other undesired results. In addition, such vibration causes the grout portion of the concrete to flow into the furrows between adjacent corrugations of the portion of joint strip 10 previously inserted into the concrete, thus insuring that there will be no voids adjacent the joint strip.

*Detailed description of "feature (f)" (first embodiment) specified in the Abstract of the Disclosure*

Proceeding next to a description of the automatic cut-off and holding means for the joint strip 10, this is best illustrated in FIGURES 4 and 7–9 and comprises first and second arms 100 and 101 adapted to be pivoted in a vertical plane which is generally perpendicular to the joint being made by the strip 10. Mounted at the ends of arms 100 and 101 are clamping plates 102 and 103 adapted to engage and grip the joint strip 10 at a region spaced rearwardly from the outlet end of insertion head 41. One of such plates, numbered 103 is resiliently mounted by means of helical compression springs 104 (FIGURE 9) which are disposed around bolts 106 extending through a bracket 107 on the arm 100.

Upon downward rotation of the arms 100 and 101 from the position shown in phantom lines in FIGURE 8 (and in solid lines in FIGURE 4) to the position shown in solid lines therein, the clamping plates 102 and 103 resiliently clamp the strip end. At the same time, a shearing knife blade 108 (which is welded to the rear vertical edge of bracket 107) engages and cuts off the strip 10. Such knife blade 108 passes closely adjacent the rear edge of clamping plate 102, so that a shearing action results. The blade 108 may have a serrated or scalloped edge, as illustrated.

The arms 100 and 101 comprise cranks which are fixedly mounted on horizontal parallel shafts 109 and 110, which shafts are suitably journaled in bearings 111. Such bearings are supported from suitable bracket means 112 on the support plate 39. The bracket means 112 also supports meshing one-to-one gear means 113 which are adapted to effect corresponding but oppositely-directed pivotal movement of the arms or cranks 100 and 101. The indicated pivotal movement results from operation of a pneumatic cylinder 114 (FIGURE 8) which is pivotally associated with bracket means 112 and is also pivotally connected to a crank 116 on shaft 110.

Upon introduction of air into cylinder 114 in a manner effecting retraction of the piston thereof, the crank 116 is operated to effect rotation of arm 100 from the solid-line position of FIGURE 8 to the phantom-line position thereof. Correspondingly, and because of the meshing relationship of the gear means 113, the arm 101 also moves from the solid-line position to the phantom-line position.

After the head 41 traverses the entire highway 11 during a strip-insertion pass, it moves horizontally out of the edge portion of such highway by a distance which is sufficient that the knife blade 108 will be disposed above the ground adjacent the edge of the highway, and will not be disposed over the highway itself. In other words, a section of strip 10 is held in open air between the concrete, wherein the strip is embedded, and the outlet end of the head 41. Cylinder 114 is then operated to effect the above-described downward pivotal movement of the arms 100 and 101, with consequent cutting of the strip 10 and also gripping of the severed strip end which is nearest the head 41.

The indicated gripping action is continued during the entire time that the head 41 is lifted due to the conjoint action of the above-described Scotch-yoke mechanism 48 and the pneumatic cylinder 43, and during the entire time such lifted mechanism is return-traversed back to the other edge of the highway. Thereafter, and as will be described, cylinder 114 is actuated to effect upward pivotal movement of the arms 100 and 101, so that the clamping action on the strip end is released. A new strip-insertion traverse is then effected across the highway, and the operation thus repeated.

Figure 12:
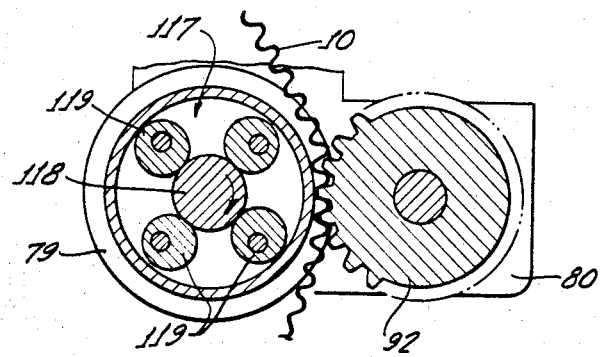
Figure 13:
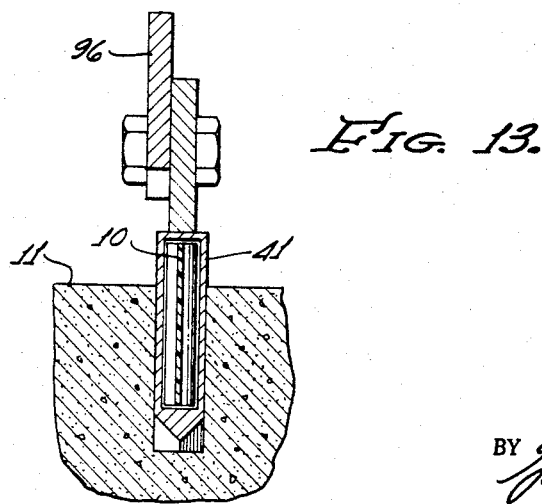

Means are provided to prevent feeding of the strip 10 during the return traverse across the highway while the head 41 is in elevated position, so that there will be no reverse-feeding during the return traverse. Such means is illustrated in FIGURE 12 to comprise an overrunning (one-way) clutch 117 which is incorporated in the drive roller 79. The clutch comprises parts 118 and 119, part 118 being directly connected to flexible drive 78. The elements 118 and 119 are so related that driving of roller 79 will be effected when the sprocket 77 (FIGURE 5) is shifted along stationary chain 76 during a strip-insertion traverse of the carriage, but will not be effected during return movement of the sprocket 77 on the chain 76. Thus, the direction of feeding is such that the drive roller 79 will be driven clockwise (FIGURE 12) during movement of the carriage from left to right (strip-insertion traverse) as viewed in FIGURE 1, but will remain stationary during movement of the carriage from right to left (return traverse) as viewed in FIGURE 1.

*Detailed description of "feature (g)" specified in the Abstract of the Disclosure*

Referring particularly to FIGURES 2 and 10, there is removably mounted at the lower portion of each of the trucks 13 and 14 a slip-form means 121 adapted to bear resiliently against the plastic concrete 11. Stated more definitely, such means comprises an inner member 122 in engagement with the vertical side or edge 123 of the concrete 11, and an outer member 124 mounted on one of the trucks 13 or 14. Suitable resilient means, indicated at 126 and comprising, for example, telescoped tubular elements containing an elongated helical compression spring, connect the inner and outer members to each other and effect resilient engagement between the inner member and the edge or side 123.

A gap 127 is provided in inner member 122 at the region where the strip-insertion head 41 either enters or leaves the edge of the concrete. In the showing of FIGURE 10, the position of the slip-form means is that which occurs a substantial period of time after the head has entered the concrete, so that the gap 127 is shown as being advanced relative to the end of the joint. Such movement is permitted because the projecting end of strip 10 is merely flattened against edge 123 by the inner member 122.

The described slip-form means insures against breakage of the edges of the concrete, particularly the concrete edge from which the head 41 emerges at the end of a strip-insertion traverse. Furthermore, the strip-form means performs other beneficial functions such as insuring that excess concrete left by the extruder mechanism will not be picked up by the rear wheels 18.

It has been found that the previously extruded concrete is not marred or disfigured to any great extent by the present strip-insertion apparatus. Thus, as described heretofore, the shoes 57 effectively smooth over the groove made temporarily in response to passage of the head 41 through the concrete. Nevertheless, the apparatus may incorporate trailer means to provide an additional finishing and leveling operation relative to the concrete, such trailer means being shown at 131 in FIGURES 1 and 2.

The trailer mechanism is illustrated to comprise one (or several axially adjacent) smoothing "float" or screed 131 which is pivotally connected to the rear frame component 24 by means of pivot members 132. Furthermore, the float 131 is connected to such member 24 by cylinders 133 (preferably pneumatic) which are disposed in angular relationship to the pivot members 132. Cylinders 133 are suitably associated with the air compressor portion of power supply 27, the relationship being such that the cylinders may be operated to determine the precise elevation of the float 131.

A suitable vibrator 134 is mounted on the float 131 to continuously vibrate the same. Furthermore, means may be provided to effect a slight degree of longitudinal reciprocation of the float as the apparatus progresses. For example, one end of the float may be disposed adjacent one of the wheels 18, and cam means may be provided at spaced points on such wheel to effect longitudinal reciprocation of the float.

The apparatus 131–134 provides a smoothing, leveling and finishing operation relative to the concrete into which the strip 10 has been inserted.

Summary of the method, and operation (first embodiment)

Stated generally, the method of the invention comprises moving a strip inserter at a predetermined rate and along a line through the upper regions of a slab of plastic concrete, continuously pushing a joint strip through such inserter at a rate equal to such predetermined rate (and in a direction opposite to the direction of push) whereby there is no relative movement between the joint strip and the concrete, and continuously vibrating the strip inserter to aid in displacing the aggregates in the concrete and to aid in setting and embedding of the joint strip therein. The method further comprises employing as the joint strip a length of transversely-corrugated plastic or the like, and maintaining the strip inserter at an oblique angle to the upper surface of the slab so that the strip is caused to turn a corner upon emerging from the inserter. Particularly where the concrete slab is a highway, the method comprises causing the inserter to emerge horizontally from the concrete at the highway edge, then cutting off the strip at the laterally-projecting portion thereof, and thereafter holding the remaining strip end and traversing the inserter over the highway prior to commencement of an additional insertion traverse. The above steps are performed by moving an apparatus longitudinally and continuously along the highway, and traversing the inserter in timed relationship to the forward (longitudinal) movement of the apparatus, the timed relationship and the inserter orientation being such that no plowing of the concrete occurs.

An additional step in the method comprises performing, as a vernier adjustment relative to the timed relation between the forward movement of the apparatus along the highway and the traversing movement of the strip inserter thereover and therethrough, a step whereby the track or support for the inserter is adjusted to a slightly oblique angle relative to a perpendicular to the longitudinal axis of the highway. Such oblique angle is correlated to the relative movements in such manner that the strip inserter moves longitudinally through the concrete, without laterally displacing or plowing the same.

With specific reference to the apparatus shown in the drawings and described hereinabove, the method of the invention comprises providing a span or track 12 the sprockets 60 and 61 of which are spaced apart sufficiently far, relative to the width of the highway 11, that the strip-insertion head 41 will enter and leave the highway edges in a substantially horizontal direction. It is to be understood, however, that (particularly in the case of entering the concrete) the direction may be termed "tangential" in that it may occur when master link 56 (FIGURE 4) is traversing the lower-left quadrant (FIGURE 4) of sprcoket 60. The invention also comprehends substantially vertical movement of head 41 into the edge portion of the concrete, although this not preferred. The amount of substantially horizontal movement occurring at the end of a strip-insertion traverse should be sufficient to permit the knife blade 108 to cut off the strip 10 at a portion thereof which projects from the edge of the highway.

As previously described in detail, the various drive relationships, and the precise angle of beam or track 12 relative to the longitudinal axis of the highway, are so adjusted that the head 41 may move longitudinally through the concrete, as the bridge (including wheels 18) progresses, in the absence of any movement of the head 41 in a lateral direction relative thereto, so that no plowing of the concrete results. Precise adjustment of the angular position of beam 12 is permitted by the pintles 16, which permit adjustment of the pintle-supporting portions 17a relative to the rigid frame of the apparatus.

Let it be assumed that the carriage 32 is initially adjacent the left or insertion-traverse beginning side of highway 11 (FIGURES 1 and 2), master link 56 then being adjacent the lower-left quadrant of sprocket 60 (as viewed in FIGURE 4). The strip-clamping mechanism (FIGURES 7–9) is then in its unclamped position, the arms 100 and 101 being generally horizontally oriented. The forward portions of supporting and troweling shoes 57 are then disposed on the edge of the concrete, and determine the elevation of the head 41 (pneumatic cylinder 43 (FIGURE 5) having sufficient air pressure therein to counteract the weight of the apparatus and permit the shoes 57 to thus function).

Figure 6:
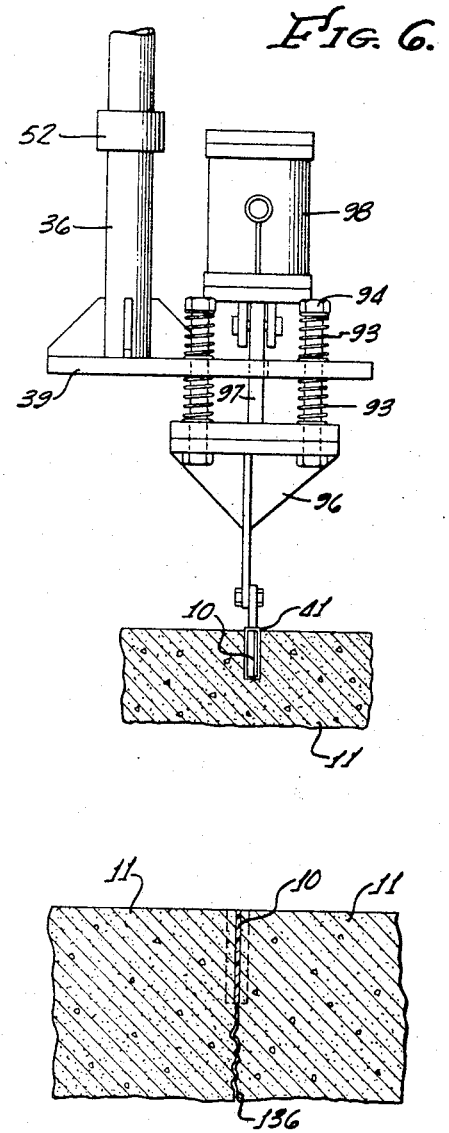

Movement of the lower run of drive chain 54 to the right, as viewed in FIGURE 4, then causes the entire carriage 32 to move correspondingly. Head or blade 41 is thus propelled through the plastic concrete, in response to such movement and also in response to the vibration action effected by the vibrator 98 (FIGURE 6). Although the head 41 thus moves through the concrete, and simultaneously displaces the large aggregates therein, the strip 10 emanating from the outlet (left) end of the head 41 remains stationary relative to the concrete. This is because, as previously described in detail, the relationship between the drive sprocket 77 (FIGURE 5) and the stationary chain 76, and also relative to the drive roller 79 to which sprocket 77 is connected by the flexible drive 78, are such that the strip is pushed rearwardly out of the head 41 at the same speed that the head moves forwardly through the concrete. In emanating from the trailing end of the head 41, strip 10 turns a corner in a vertical plane, such turning being permitted by the corrugated nature of the strip as described above.

In the stated manner, the entire highway 11 is traversed by the carriage and head, and a strip or tape 10 is inserted to the desired depth into the plastic concrete. The troweling and elevation-determining shoes 57, in riding on the upper concrete surface, cooperate with the pneumatic cylinder 43 in causing the elevation of the head 41 to remain constant relative to the elevation of the upper highway surface. Thus, the head follows slight depressions in the concrete, and also changes elevations when the highway is of the crowned variety.

When the end of a strip-insertion traverse (left to right) is reached, the trailing edge of insertion head 41 leaves the vertical edge of the highway so that a portion of the strip 10 is in midair adjacent the highway. As previously described, a slip-form apparatus 121 (FIGURE 10) having a gap 127 therein to permit movement of the head 41 therethrough, insures against any breakage of the concrete edge due to movement of the head 41. When the knife blade 108 is disposed above a projecting (not embedded) section of the strip 10, pneumatic cylinder 114 (FIGURE 8) is actuated to shift the arms 100 and 101 down to the positions shown in solid lines in FIGURE 8, causing the strip 10 to be cut off and clamped as stated in detail above.

At substantially the same time that the cutting and clamping mechanism is actuated, the pneumatic pressure delivered to cylinder 43 is increased sufficiently to aid in raising the head and associated apparatus until the head 41 is completely above the upper surface of the concrete. Such lifting of the apparatus is also effected by the Scotch-yoke mechanism 48, in that the link 56 moves around the idler sprocket 61 (FIGURE 1) and causes the bearings 51 (FIGURE 4) to engage the under sides of collars 53 on shafts 36 to thus raise the shafts 36 and connected head by a distance approximately equal to the diameters of sprockets 60 and 61.

Particularly because the Scotch-yoke mechanism 48 simultaneously effects uniform deceleration in a horizontal direction and acceleration in an upward direction, the shock loads incident to lifting of the apparatus are relatively small. This is despite the fact that the speed of traverse may be rapid, on the order of 48 feet per minute or even very much higher.

Also at substantially the same time the cutting and clamping mechanism is operated, air pressure is delivered to reel brake 84 (FIGURE 5). Overtravel of the strip-storage reel 81 is thus effectively prevented.

The return traverse is then effected (right to left, FIGURES 1 and 2) as the master link 56 moves with the upper run of drive chain 54. During this time, pressure is maintained in cylinder 114 (FIGURE 8) to hold the arms 100 and 101 in vertical positions and thus keep the projecting end of strip 10 clamped and properly oriented. As previously described, the strip 10 is not fed during such return traverse, because the one-way or overrunning clutch 117 (FIGURE 12) prevents driving of the feed roller 79 at this time despite rotation of sprocket 77 along stationary chain 76 (FIGURE 5).

As soon as the head 41 has been returned to the space above the road bed adjacent the "inlet edge" of the concrete, the air pressure in cylinder 43 (FIGURE 5) is bled substantially and therefore decreases to the requisite amount necessary to maintain the shoes 57 in floating relationship on the upper concrete surface. Such bleeding, and the downward movement of the master link 56 around drive sprocket 60, effect lowering of the head and associated apparatus until the shoes 57 (at their leading edge portions) engage the upper concrete surface. Such action is substantially shock free, because of the timed bleeding of the air pressure, and because of the previously-indicated operation of the Scotch-yoke mechanism 48 in effecting deceleration and then acceleration in a smoooth and uniform manner. At substantially the same time, the clamping cylinder 114 (FIGURE 8) is operated in a direction effecting upward pivotal movement of the arms 100 and 101 to the releasing positions shown in phantom lines. In addition, the braking operation of reel brake 84 is discontinued. The operation is then repeated to insert an aditional length of strip 10 into the highway.

During the described operations, the apparatus is continuously self-propelled or drawn ahead, for example by connecting the drawbar mechanism 26 (FIGURE 1) to the extruder or prime mover E. As described in detail above, the traversing speed of the carriage 32 is related precisely to the forward speed of the bridge because one of the bridge wheels 18 (FIGURE 3) is connected through timing chain 67 to the sprocket 68 which (FIGURE 11) determines the speed of drive sprocket 60 for chain 54. The hydraulic motor 63, which also actuates the drive sprocket 60, serves as a power booster but does not control the speed of drive.

The apparatus is thus operative to lay down sections of joint strip 10 in parallel relationship and at desired intervals. It is to be understood that the apparatus moves ahead during the entire time the carriage 32 traverses in the return or right-to-left direction, and that this determines the spacing between the sections of joint strip. The degree of spacing may be changed in various ways, one of which is by temporarily interrupting the drive for carriage 32 during the return traverse in order to increase the distance between joints. Also, for example, one of the gear boxes 69 and 70 (FIGURE 11) may be made to operate as a transmission, and the speed of return traverse varied as desired.

Figure 14:
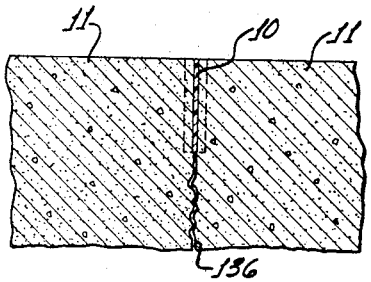

Referring next to FIGURE 14, a joint strip 10 is shown in section. Such joint strip forms, in combination with adjacent sections of highway 11, and also in combination with a crack 136 which forms in the highway beneath the joint strip after setting and curing of the concrete, a joint between adjacent highway sections. Particularly because the joint strip 10 is inserted to the proper depth in a uniform manner, the crack 136 is highly straight and regular in a horizontal direction. However, as viewed in the vertical direction (FIGURE 14) the crack is sufficiently irregular to effect the desired amount of interlocking between the adjacent concrete slabs. Thus, the elevations of the adjacent slabs relative to each other are maintained constant.

It is to be understood that setting and curing of the concrete causes the same to shrink by an amount which is greater than any expansion of the cured concrete during hot weather and after curing and setting are completed. Therefore, the resulting cracks 136 are sufficiently wide to compensate for expansion of the concrete during hot weather. It follows that there will never be any buckling of the adjacent concrete slabs. All need for sawing, thick joints, etc., is thus completely eliminated by the present method and apparatus.

Figure 15:
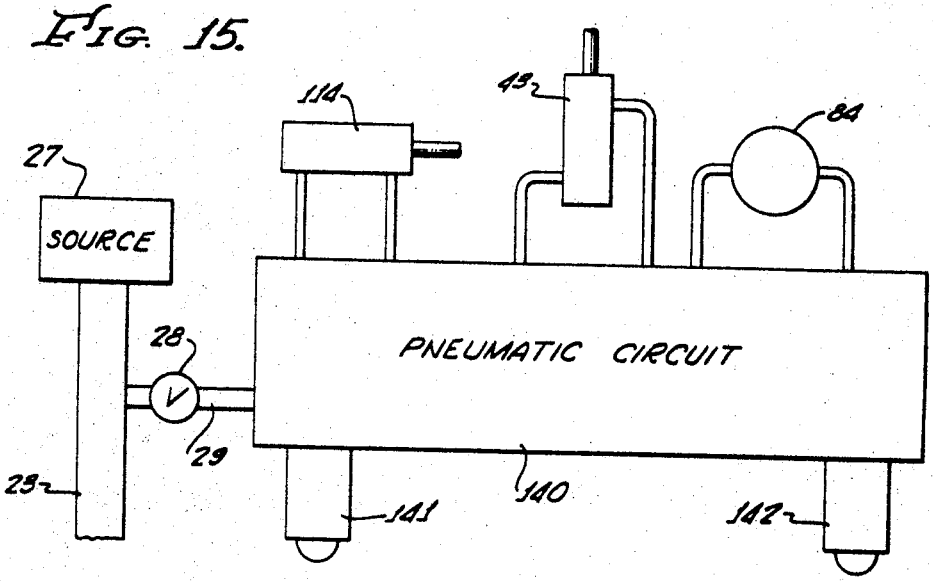

Referring next to FIGURE 15, a pneumatic circuit 140 is schematically represented for effecting, automatically, the above-indicated operations of the pneumatic elements 43, 84, and 114. Such pneumatic circuit is supplied with air from source 27, via air-receiver frame element 23 and hose 29. The pneumatic circuit is controlled by valves (air buttons) 141 and 142. The valves, in turn, are controlled by actuators 143 which are mounted at suitable locations adjacent beam or track 12 (FIGURE 2). The relationships are such that the valves are operated at suitable times by actuators 143, in the manner of limit switches.

The track 12 may, if desired, be moved along the highway in skewed relationship, as distinguished from being generally perpendicular to the highway axis as shown in FIGURE 2. Such skewed relationship may be desirable, for example in instances where it is wanted to cause the inserted joint strip to be exactly perpendicular to the highway axis as distinguished from being oblique thereto. It is emphasized, however, that an oblique orientation of the joint is normally greatly preferred in order to minimize vibrations in vehicles passing over the highway.

It is to be understood that, if desired, an additional span or track 12 may be provided between the trucks 13 and 14. Such additional track may have a second carriage mounted thereon, the purpose being to insert additional strips into the highway. For example, one strip-insertion head may lay strip during a carriage traverse from the left side of the highway to the right side thereof, whereas the second strip-insertion head (one the second track or span) may lay strip during its traverse from the right side of the highway to the left side thereof.

The idler "sprocket" 61 is preferably a mere disc (without teeth). The chain guides 62 should extend to a point closely adjacent such sprocket.

As best shown in FIGURE 16, the shoes 57 are arranged in V-relationship (having upturned leading edges). Thus, the concrete tends to mound up in the region of inserter head 41. There is therefore excess concrete available for troweling into the groove behind the head, so that there will be no voids adjacent the strip. A trowel portion T (FIGURE 16) connects the two shoes 57 (for example, integrally) and effectively fills and smoothes over the groove.

DESCRIPTION OF THE SECOND EMBODIMENT, FIGURES 17–27, INCLUSIVE

The second embodiment, FIGURES 17–27, is substantially identical to the first embodiment of FIGURES 1–16, except as will be indicated hereinafter. Parts in the second embodiment which correspond generally to the first embodiment are numbered correspondingly, except that the letter *a* is added in some instances.

It is to be understood that, relative to both the first and second embodiments of the invention, and when the speed of the associated concrete extruder along the highway is not great, the strip-insertion apparatus may be moved forwardly along the highway in a stop-start manner instead of in the continuous manner described in detail heretofore. In other words, the apparatus may be moved along the highway to the point where it is desired to insert a strip, following which the truck portions 13 and 14 are maintained stationary while the carriage 32 moves along the main span or track portion 12 in a strip-insertion traverse. This may be accomplished, for example, by disengaging the previously-indicated clutch 71 (FIGURE 3). When a particular apparatus is of the stop-start type, the drive relationship between chain 76, sprocket 77 (FIGURE 5) and the drive rollers for the strip or tape is caused to be such that the tape is fed rearwardly at a speed equal to (but in a direction opposite form) the rate of travel of the carriage along the beam or track 12. This is to be distinguished from the previously-described operation wherein the rate of tape feed is caused to be equal to the resultant of the rate of travel of the carriage along the beam and the forward progress of the entire apparatus longitudinally of the axis of the highway (because, in stop-start operation, there is no longitudinal movement of the apparatus along the highway during strip-insertion traverses).

Where the joint strips are to be put in obliquely of the longitudinal axis of the highway, as is normally desired, the frame and/or beam 12 of the stop-start apparatus is constructed and/or mounted in a slanted, canted or skewed manner such that the beam or track 12 is not perpendicular to the highway axis (as shown in FIGURE 2) but instead is oriented at an oblique angle relative thereto.

The second embodiment will be described as being of the stop-start type, although it is emphasized that the second embodiment is inherently fully capable of continuous operation. Being described as a stop-start apparatus, there are two differences from the first embodiment: (a) the strip or tape is pushed rearwardly at a rate equal to the rate of carriage movement along track or beam 12, and (b) the head or blade is parallel to track 12 (see FIGURE 24).

*Detailed description of "feature (b)" (second embodiment) specified in the Abstract of the Disclosure*

Referring first to FIGURE 25, a mass of flat (not pre-corrugated) plastic tape or strip 150 is shown as wound on the above-described reel 81 of carriage 32a. The tape 150 may be, for example, approximately 0.020 inch thick and 2 inches wide, having stright parallel edges. Because the tape is thin and uncorrugated, an enormous amount may be provided on the reel 81. As one example, the amount of such tape provided on a single reel 81 may be 3000 feet. It is emphasized that the tape may be much thicker if desired.

The tape may be formed (for example) of a styrene polymer or co-polymer, such as high-impact polystyrene. More specifically, an exemplary tape is formed of rubber-modified "AT 88.5," sold by the Monstanto Company.

The indicated type of tape, particularly when not pre-corrugated, is relatively inelastic although it is flexible and resilient in a direction perpendicular to the plane of the tape. Thus, the strip or tape is not readily stretched and not readily compressed in a longitudinal direction, being therefore characterized by the substantial absence of creep after introduction into the concrete. Futhermore, such tape is sufficiently slippery to be readily fed in a relatively frictionless manner, the only major problem being to feed such inelastic tape around a corner in a vertical plane as will be described below.

In summary, therefore, the tape or strip 150 is one readily capable of being pushed through, as distinguished from pulled through, a strip-insertion blade or head. By "inelastic," applicant intends to denote resistance to longitudinal stretching or compression (without regard to whether or not the original shape is readily resumed).

From reel 81, the tape passes downwardly around a fixed cylindrical guide member 151 (FIGURE 17) which is suitably mounted on the support plate 39a. After passing around the fixed guide 151, which should not be rotatable, the tape 150 passes through another guide 152 on plate 39a. The tape then passes downwardly and laterally around an additional fixed guide 153 also preferably comprising a non-rotatable cylindrical post or pedestal. Thereafter, and as shown in detail in FIGURE 22, tape 150 passes between a feed roll 154 and its associated backup roll 155.

The feed roll 154 should be a cylindrical metal wheel which is knurled for positive gripping of the tape, whereas the backup roll 155 should have a rubber peripheral portion and be spring-pressed against the feed roll in order to aid the latter in positively gripping the tape. Accordingly, the tape 150 is driven at a rate directly and constantly related to the rate of rotation of the feed roll.

Feed roll 154 is driven, in a manner described in detail relative to the previous embodiment, by the drive 78 (FIGURE 5) which connects the roll to the sprocket 77 meshed with stationary chain 76. Thus, as the carriage 32a moves along the track 12, sprocket 77 rotates and drives the feed roll 154 at a rate determined by the rate of movement of the carriage along track 12. The overrunning clutch (or one-way clutch) described in detail relative to FIGURE 12 is incorporated in the indicated drive between sprocket 77 and the feed roll 154, to prevent feeding of tape in the reverse direction during return traverse of the carriage across the highway after a strip-insertion traverse.

The rolls 154 and 155 are mounted in a housing 157 which communicates directly with the leading or inlet end of the strip-insertion head or blade 158 which forms an extremely important part of the present invention. The strip or tape, when passing between the rolls 154 and 155, lies in a vertical plane. Furthermore, at least part of each region along the length of tape 150 continues to lie substantially in this vertical plane during the entire time the tape moves through blade or head 158 into the concrete highway 11. The problem of causing the tape (including relatively inelastic tape) to turn the requisite corner while being pushed by the drive roll 154 is solved by constructing the blade or head 158 in a peculiar manner, as will next be described, and which also causes such blade to move readily through the concrete at relatively high speed and with a minimum of disturbance thereof.

The housing 157 and post or pedestal 153 are suitably mounted on the same undercarriage (described below relative to reference numeral 171) which supports head or blade 158.

*Detailed description of the head or blade 158 and associated method, which comprises "feature (c)" specified in the abstract of the disclosure*

The head or blade 158 is illustrated most clearly in FIGURES 23 and 27, and comprises means to cause a section of at least the upper edge portion of the tape or strip 150 to follow a path which is scalloped, undulating, zig-zag, etc.

Stated more definitely, the apparatus and method involve causing the upper edge portion of the tape 150 (relatively remote from the concrete) to move laterally of a vertical plane containing the portion of tape 150 disposed in the concrete highway 11, and also move generally parallel to such vertical plane. The lower edge of the tape 150 (relatively adjacent the concrete) is caused to remain in the indicated vertical plane but to follow an arcuate path in such plane. The axis of the tape is thus shifted from a downwardly-inclined orientation (adjacent the inlet end of element 158) to a horizontal orientation (adjacent the outlet of such element). Such bending of the tape, from downwardly-inclined to horizontal, is best indicated in FIGURE 17.

The method and apparatus involve corrugating or scalloping at least a portion of the flat (not pre-corrugated) tape 150 in situ during introduction into the concrete 11, and then causing the tape to become uncorrugated and unscalloped as it leaves the blade or head.

The preferred embodiment shown in FIGURES 23 and 27 operates entirely differently from the embodiment wherein the tape 10 is precorrugated. Referring to FIGURE 4, it will be noted that the precorrugated tape 10 passes downwardly along a straight path through the element 41, and then suddenly turns a corner at the outlet end of the element 41. In the blade 158 shown in FIGURES 23 and 27, on the other hand, the entire middle region of element 158 is arcuate or curved about a center point (see also FIGURE 17), so that the tape 150 passes around a large-radius corner and does not make a sudden change in direction.

Very desirably, the lower edge of tape or strip 150 is not scalloped or corrugated at all but instead, as stated above, remains in the vertical plane containing the portion of tape 150 which has already been disposed in the concrete 11. This not only minimizes the friction of the tape when passing through the blade or head 158, but also permits the blade 158 to be so constructed that a minimum disturbance of the concrete 11 will be effected as the blade passes therethrough. It would be possible to corrugate the lower tape edge in situ, provided the upper edge is corrugated to a much greater extent (this construction not being preferred, as indicated in the preceding sentences).

It might be thought feasible to pass a tape downwardly through a blade or head, without either pre-corrugating the tape or causing the tape to turn the corner while in the blade. However, if a flat (not pre-corrugated) tape or strip is merely passed downwardly through a straight blade, so that the axis of the discharging tape is downwardly-inclined instead of horizontal, several results occur which are completely unacceptable. Such results include: (a) the tape deposited in the concrete will follow an erratic line, instead of a straight one (the tendency toward spalling being greatly increased), and (b) the depth of tape insertion cannot be properly controlled. This is especially true when the tape is pushed out of the blade instead of being anchored and pulled out.

The precise blade 158 shown in FIGURES 23 and 27, as well as in other figures, and which constitutes the preferred embodiment, has an upper edge 161 which is generally sinusoidal and a lower edge 162 which is arcuate. The sinusoidal upper edge 161 extends on both sides of a vertical plane which contains the lower edge 162. The distance between upper edge 161 and lower edge 162 remains substantially constant, despite the fact that the lower edge 162 (and thus the upper edge) is arcuate about a center point disposed a substantial distance above the blade. For example, the radius distance to such center point may be several feet.

Between the upper and lower edges 161 and 162, the amplitude of the sine wave progressively diminishes, such amplitude reaching zero prior to the time that the lower edge 162 is reached. The amplitude may be regarded as the excursion of the sine wave on opposite sides of the indicated vertical plane (which corresponds to the axis). Such decreasing amplitude may be seen upon reference to blade 158 as shown in FIGURE 23.

Stated in another manner, the sides (exterior surfaces) of the head or blade 158 comprise a series of adjacent conic sections having their apex regions near the lower edge 162, and their base regions near the upper edge 161. The conic sections are alternating in nature so that the generally sinusoidal or scalloped configuration results along the upper edge 161 as previously described. Along either side of the head 158, alternate conic sections 163 are externally convex, whereas the remaining alternate conic sections 164 are externally concave. The apex regions of the indicated conic sections are spaced from each other along the portion of the head adjacent lower edge 162. It is to be understood that the conic sections merge gradually and need not be geometrically precise. The axes of the various conic sections, corrugations or scallops are transverse to the axis of the tape.

The side walls of the blade or head 158 are spaced from each other by a relatively uniform distance which is preferably only a small amount greater than the thickness of the tape 150. Exemplary clearance distances will be set forth below.

Each end 166 and 167 of the blade or head 158 is preferably straight, so that the tape 150 will lie in the specified vertical plane as it enters and leaves the undulating or scalloped region described in the preceding paragraphs. At the outlet end, the straight section 167 assures that the tape 150 will be straight (uncorrugated) and free from stress as it enters the concrete 11.

The illustrated head or blade 158 is formed of a piece of sheet metal (for example, steel) which is bent upwardly about a line through lower edge 162, so that any transverse section of the element 158 is generally hairpin shaped (FIGURE 27). Since the illustrated blade or head is made of sheet metal, the above-stated detailed description of the exterior surfaces of the blade applies also to the interior surfaces thereof. In other words, the strip or tape passage (which is numbered 165 in FIGURE 27) has opposed and generally parallel side walls (numbered 165a and 165b therein) which are shaped correspondingly to the described exterior surfaces of the blade or head 158.

It is to be understood that the blade 158 is not necessarily sheet metal, although this is one advantageous and economical way to manufacture the same. Furthermore, the shapes of the exterior and interior surfaces of the blade 158 need not necessarily correspond in all embodiments of the invention, but such correspondence is distinctly advantageous and preferred.

Except at the extreme outlet end 167, that is to say the mouth of such outlet end, the distance between parallel arms of any hairpin-shaped section may be (for example) approximately 0.040 inch when a tape 150 of 0.020 inch thickness is employed. Thus, there is a clearance of approximately 0.010 inch on each side of the tape. At the extreme outlet end 167, such clearance should be reduced to approximately 0.005 inch on each side of the tape, in order to insure against ingress of grout into the outlet end of the blade during predetermined portions of the strip-insertion cycle. It is to be understood that, unless such ingress is prevented, grout may build up in the blade and cause binding of the tape.

The upper edge 161 is shown as being closed by a strip or ribbon 168 which is suitably soldered, welded or otherwise locked in place. The distance between adjacent regions of strip 168 and lower edge 162 is caused to be sufficient that there will be adequate clearance adjacent each tape edge. For example, a clearance of $\frac{1}{32}$ to $\frac{1}{16}$ of an inch may be provided adjacent each edge of the tape.

It is pointed out that the extreme upper and lower edges of the tape or strip 150 need not bear with any substantial pressure against any portion of the ribbon 168 or lower edge 162. This is because the lateral pressures exerted on the opposed sides of the tape or strip 150 cause the upper regions only to follow the specified undulating path, which operates automatically to bend the lower edge of the tape around the necessary corner. Thus, for example, the lower tape edge would bend in an arc even if there were no closure adjacent thereto, it being understood, however, that the closure is necessary in order to prevent ingress of grout.

The tape or strip, when moving through the scalloped blade section, rubs only along small portions of the undulating side walls 165a and 165b, so that friction is reduced to a minimum. The embodiment shown in FIGURE 23 has only seven scallops or undulations (3½ complete cycles of a sine wave), which means that the tape need only rub substantially along seven regions of the walls within the apparatus.

As a specific example, the illustrated seven undulations cause the tape axis to bend around an angle of approximately twenty degrees. Thus, the axis of the strip as it enters the head or blade 158 is at an angle of approximately twenty degrees from the horizontal. Such axis, as the tape leaves the head or blade 158, is at an angle of approximately zero degrees from the horizontal.

Also as an example, and relative to the exemplary two-inch tape, the radius of each of the seven exterior conic sections 163 and 164 shown in FIGURE 23, at upper edge 161, may be approximately one inch. The distance between parallel lines which are tangential to the exteriorly-convex conic sections 163, at edge 161, may be about ¾ inch.

It has been found that the resistance presented by the head 158 to pushing of the tape therethrough (by rollers 154 and 155, FIGURE 22) is surprisingly less than the resistance presented by the head to pulling of the tape therefrom (as by an operator pulling on the tape or strip at the left end of FIGURE 23). Furthermore, and very importantly, when the tape is thus pulled it presses against strip 168 with such force and friction that the upper tape edge cracks or crazes. The strip or tape being thus damaged, it may jam after only a few feet are pulled.

Because the tape 150 may be thin (only 0.020 inch in the illustrated example), and because the lower edge of the tape lies in a single plan, it follows that the lower edge 162 of the blade or head 158 may be relatively sharp. This facilitates passage of the blade through the concrete during the strip-insertion traverse. It is again pointed out that the tape or strip 150 may, if desired, be very much thicker than in the specified example.

Very surprisingly, it has been found that the undulating side walls of the blade or head 158 do not impede the traverse of the blade through the concrete, but instead permit such traverse to be made at a maximum speed and with a minimum of required power. The blade shape presented to the concrete is best illustrated in FIGURE 27, and cooperates with the vibrating means (to be described hereinafter) to provide a very smooth, fast and low-power traverse through the concrete. Furthermore, the traverse is effected without disturbing substantially the position of the aggregates in the concrete, the result being that the aggregates lie close to the tape after the same is inserted therein. This is important, as stated above, in order to prevent spalling of the concrete due to stresses exerted by trucks and automobiles passing over the highway.

The blade 158 may be mounted on the carriage in any suitable manner. For example, as shown in FIGURE 20, the upper edges of the blade side walls are shown as being connected to or integral with a mounting portion 169 which extends downwardly from an undercarriage 171. Such undercarriage is vibrated as will be set forth hereinafter, being suspended from the support plate 39a in a manner permitting such vibration of the undercarriage and thus of the head 158.

The previously-described housing 157 for the feed and backup rolls 154 and 155, respectively (FIGURE 22), is also (as previously indicated) suitably connected to the undercarriage 171 and/or mounting portion 169. Thus, the housing 157 vibrates with the blade 158, but to a lesser degree because of the relatively high mass of the housing 157 and the elements closely associated therewith.

A drive element 172 (FIGURE 25) is mounted on the housing 157 and forms part of the drive 78 which transmits motion from the sprocket 77 (FIGURE 5) to the drive roller 154. Such drive incorporates, as previuosly described and as illustrated in FIGURE 12, a one-way clutch which prevents feeding of the tape during the return traverse. It is to be understood, however, that such one-way clutch may be mounted relatively close to the sprocket 77 (FIGURE 5) instead of being mounted at the lower end of the drive element 78 as previously described.

*Detailed description of the sensing, elevation-adjustment and finishing means of the second embodiment ("feature (d)" recited in the abstract of the disclosure)*

As described in detail relative to the previous embodiment, the elevation of the blade or head 41 was determined by the conjoint operation of the cylinder 43. Scotch-yoke mechanism 48, and shoes or floats 57 (the latter bearing a substantial amount of weight). In accordance with the present embodiment, the Scotch yoke may still be employed (although it can be omitted) but no float or trowel bears any more weight than is necessary for finishing purposes.

Instead of causing the elevation of head 158 to be adjusted in accordance with the elevation of the weight-supporting finishing shoes or floats 57, the present embodiment provides a sensing shoe 174 which should be located immediately in advance of the head or blade 158 and which continuously controls the air-pressure conditions in a double-acting cylinder 43a (FIGURE 25) to thus determine the elevation of the blade 158 and of the finishing means. Thus, in the present embodiment, no finishing element bears any substantial weight other than that required for proper finishing, the elevation of the finishing means and of the blade 158 being instead dependent upon the air-pressure conditions in cylinder 43a.

Sensing shoe 174 is mounted on a pair of corresponding arms 175 (FIGURES 17, 19 and 24) the rear ends of which are pivotally connected, respectively, to opposite edge portions of the support plate 39a. The pivotal connections are indicated at 176 in FIGURES 17 and 19, and permit pivoting of the shoe about a horizontal axis. The connection of arms 175 to shoe 174 is preferably fixed (not pivotal) as shown at 177 in FIGURE 24. In the described manner, therefore, the sensing shoe 174 is pushed ahead of the blade or head 158, and rests upon the upper surface of the wet concrete.

Sensing shoe 174 is sufficiently light and large that the pressure exerted against the concrete will be light, for example 0.8 ounce per square inch. It is pointed out, however, that the shoe should be sufficiently heavy that it will not be elevated in response to a mere pebble on the surface of the concrete, being instead responsive to the overall or averaged elevation of the concrete surface beneath the shoe. In other words, the sensing shoe should be sufficiently heavy to "iron in" a small pebble instead of responding thereto.

Linkage means are provided to create a valve-controlling function in response to a change in the elevation of sensing shoe 174 relative to support plate 39a (which is a "mounting means" for the shoe, blade 158, etc.). The illustrated linkage means comprise a link 178 which is pivotally connected to the shoe and which extends upwardly for pivotal connection to one arm of a bell crank lever 179, the latter being suitably fulcrumed to the support plate 39a by means of a yoke 180 (FIGURE 19). More specifically, the yoke 180 is mounted on a saddle plate 39b which, in turn, is suitably secured to support plate 39a. The remaining arm of the bell crank 179 is pivotally connected to a link 181 which extends substantially horizontally to a slide element 182 (FIGURE 21), the latter being suitably mounted on saddle plate 39b in sliding relationship. An actuating lug or ear 183 (FIGURE 21) is fixedly mounted on the slide 182 and extends between actuating portions 184 of air valves 186 and 187. Such valves, which are suitably mounted on the saddle plate 39b, are both normally closed and are adapted, respectively, to control bleeding of air through air hoses 188 and 189.

Valves 186 and 187 are highly sensitive, and should be continuously preloaded, in such manner that only a relatively slight movement of the actuating lug 183 will operate the same. Such sensitivity and preloading prevent hunting and other undesirable effects. By "preloaded," applicant intends to denote that when lug 183 is in a neutral position, each normally-closed valve 186 and 187 will be leaking a slight amount of air. Accordingly, movement of lug 183 in either direction will cause: (a) full closing of one valve, and (b) substantial opening of the other.

Suitable adjustment means, such as a turnbuckle, may be incorporated in link 178 (or any other link) to provide an adjustment function. Such adjustment function alters, because of the pivotal connection of arms 175 to support plate 39a, the angle of incidence of sensing shoe 174 and thus changes the unit pressure exerted by the sensing shoe against the underlying concrete.

Referring next to the upper portion of FIGURE 25, an air pressure source is schematically represented at 191 and may comprise, for example, the above-indicated air receivers formed by spans or beams 23 and 24 of the frame of the apparatus. Air pressure source 191 is connected through a suitable pressure regulator 192 to the air hose or line 188, and is also connected through a second pressure regulator 193 to air hose or line 189. The hose or line 188 leads from valve 186 (FIGURE 21) to the upper end of cylinder 43a, whereas line 189 leads from the second valve 187 to the lower end of cylinder 43a. Pressure regulator 192 is adapted to supply a lower pressure to the upper end of cylinder 43a than that supplied to the lower end thereof by pressure regulator 193. For example, the pressure differential may be on the order of 20 p.s.i. This helps compensate for the weight of the head, shafts 36, plate 39a, etc.

Let it be assumed that the sensing shoe 174 moves downwardly relative to support plate 39a, due to a lowering in the elevation of the surface of the roadway. The resultant movement of link 181 to the right (FIGURE 21) causes opening of valve 187 and also causes full closing of valve 186. Accordingly, air bleeds from hose or line 189, and thus from the lower end of the cylinder 43a (FIGURE 25), but does not bleed from hose or line 188. Such bleeding of air causes downward shifting of the piston within cylinder 43a, and consequent lowering of yoke 47, shafts 36 and the entire lower portion of the apparatus including the support plate 39a and the blade 158.

There is thus caused an upward movement of the sensing shoe 174 relative to support plate 39a, thus shifting slide 182 to the left so that the lug 183 effects opening of valve 186 and complete closing of valve 187. Accordingly, the only bleeding of air is through line or hose 188 from the upper end of cylinder 43a, so that downward shifting of the piston is cylinder 43a ceases. Thus, downward shifting of the lower portion of the apparatus is discontinued. The described operation then continues, in a highly sensitive manner, and maintains the blade 158 at the exact desired depth in the concrete.

The decribed pneumatic operation inherently produces a time delay which is desirable in that it provides a smoothing and hunting-preventing operation. Furthermore, this time delay is approximately equal to the time required by the blade or head 158 to reach the portion of the highway 11 originally sensed by the shoe 174. Thus, the elevation of the blade 158, relative to the highway surface, is maintained very accurately and smoothly.

When the edge of the highway is reached at the end of a strip-insertion traverse, the shoe 174 falls off such edge. To prevent undersired downward shifting of blade 158 in response to such lowering of the shoe 174, an additional valve 194 (FIGURE 25) may be provided in line 189 in series with valve 187. Valve 194 is normally open, being closed at the end of each strip-insertion traverse by a suitably-located actuating element which may correspond to actuating element 143 provided at the right end of beam 12 in FIGURE 2. Thus, valve 194 prevents valve 187 from bleeding air from line 189 during the short period of time (at the end of each strip-insertion traverse) when the valve 194 is closed.

Proceeding next to a description of the finishing apparatus which trails the blade or head 158 in order to fill in and smooth over the groove formed thereby in the concrete, this is best illustrated in FIGURES 19 and 24 to comprise first and second chevron trowel elements 196 and 197 followed by a finishing float 198.

Each chevron trowel 196 and 197 is disposed at an acute angle relative to the direction of forward travel of the carriage, for example a forty-five degree angle relative thereto as shown in FIGURE 24, the trowels diverging from each other in a forward direction. Trowel 196 is disposed somewhat in advance of trowel 197, each trowel having an upwardly curved forward edge portion 199.

The trailing corner of the front curved edge of trowel 196 is located a short distance to the rear of the blade or head 158, and extends a short distance across the groove 201 (FIGURE 24) which is formed in concrete 11 due to traverse of the blade 158 therethrough. Such corner of trowel 196 therefore pushes into the groove 201 the concrete which is humped or mounded up as the result of traverse of the blade 158. Such mounded-up regions of the concrete are indicated at 202 in FIGURE 20.

A second groove-filling operation is provided by the trailing corner of the curved forward edge of rear trowel 197, which forward edge is spaced from the end of front trowel 196 as indicated at 203 in FIGURE 24. The forward edge of rear trowel 197 provides a second groove-filling operation. The result is that the excess concrete appears to follow a generally curved path around the trailing corner of the front edge of front trowel 196 and then around the trailing corner of the front edge of rear trowel 197, generally as indicated at 204 in FIGURE 24. This effectively fills in the groove 201 with concrete from both sides thereof. The remaining concrete which trails behind the second chevron trowel 197 is smoothed over and flattened by the finishing float 198 described below.

Each of the chevron trowels 196 and 197 is supported on two posts or bolts 206 (FIGURES 17, 18 and 24) having their lower ends fixedly connected to the trowels. The upper ends of bolts 206 extend through openings in support plate 39a, being threadedly associated with nuts 207 which may be turned in order to raise and lower the trowels 196 and 197 relative to the support plate. Washers 208 are welded to bolts 206 in order to seat helical compression springs 209 which are disposed below the plate 39a. Suitable sleeves 208a are welded to the upper surface of plate 39a, and receive the bolts 206 in close-fitting but sliding relationship. The springs 209 permit upward movement of the bolts 206 (and thus the trowels) relative to plate 39a.

The finishing float 198 is a relatively large trailing element which is shown as having a recessed or indented forward edge, two sides of the recess or indentation being generally parallel to the chevron trowels 196 and 197. The forward and side edges of the finishing float are curved upwardly to form a flange 210. The float 198 extends laterally from the tape a sufficient distance to finish over all portions of the concrete surface contacted by the trowels 196 and 197 and by sensing shoe 174.

The mounting means for float 198 comprises four bolts 211 which are pivotally connected to the float 198 and extend upwardly through oversize openings in support plate 39a. Nuts 212 are provided on the upper ends of the bolts, and helical compression springs 213 are provided between the nuts and the upper surface of the support plate. Thus, turning of the nuts 212 causes the springs 213 to absorb desired portions of the weight of the float 198, providing an adjustment function.

Drag links 214, which may be turnbuckles, are connected between float 198 and brackets 215 which extend downwardly from support plate 39a. Such links aid in moving float 198 forwardly along the concrete.

*Detailed description of vibrating means, second embodiment ("Feature (e)" recited in the abstract of the disclosure)*

Referring particularly to FIGURE 20, the undercarriage 171 is shown as being suspended by bolts 216 from opposite sides of a cut-out recessed portion 217 of support plate 39a The bolts extend through oversize or clearance openings in the undercarriage, there being helical compression springs 218 provided above and below the undercarriage as previously indicated relative to FIGURE 6. Therefore, the undercarriage 171 and connected blade 158 may be vibrated through a considerable distance without effecting substantial vibration of the support plate 39a.

A vibration means is indicated schematically at 220 in FIGURE 20, being shown as mounted directly on the undercarriage so that operation of the vibration means causes the undercarriage and head 158 to vibrate with it. The vibration means 220 may generally correspond, for example, to the vibration means shown at 98 in FIGURE 6, and may be of a suitable air-operated variety known in the art. Vibration means 220 creates vibrations which are substantially vertical.

The vibration of blade 158 effected by vibration means 220 should be relatively low frequency, high amplitude and heavy. Thus, for example, the rate of vibration may be 3600 cycles per minute, and the amplitude of vibration should be such that the blade 158 vibrates through a total amplitude of about ¼ inch when suspended in air (total amplitude denoting the distance from a maximum upper point to the maximum lower point, that is to say twice a ⅛ distance on each side of the axis of vibration). The vertical amplitude of vibration decreases substantially when the head is immersed in concrete, so that the total amplitude (twice the excursion from the opposite sides of the axis) may be approximately ⅛ inch when the blade is in concrete. The force of the vibration may correspond, for example, to the weight exerted by a 3000 pound mass when such mass is supported (without being moved) on the upper edge of the blade 158. This is known as 3000 pounds impact force.

The vertical vibration of blade 158 by vibration means 220 is very important in effecting proper movement of the blade or head 158 through the concrete. Not only is the blade 158 caused to enter the concrete smoothly and easily, but the forward progress thereof through the concrete is effected with a minimum of effort or force. The vibration causes the knife-like lower edge of the blade to separate the aggregates the required distance, without causing aggregates to be pushed or rolled ahead of the blade (in the direction of motion thereof). The vibration also aids in causing close contact between the aggregates and the tape portion which is embedded in the concrete.

The chevron trowels 196 and 197 are not vibrated, being instead supported directly from the support plate 39a which is relatively isolated from all vibratory elements. The reason the chevrons 196 and 197 are not vibrated is that it is not desired to segregate from the aggregates the grout present in the mounds 202 shown in FIGURE 20. In other words, it is desired that the trowels 196 and 197 trowel the concrete from mounds 202 directly into the groove 201 (FIGURE 24) without segregating or stratifying the mass of concrete. Thus, the concrete maintains its original composition, as is desired, which results in high degree of finish strength and maximum resistance to spalling.

First and second vibrating elements 222 and 223 are mounted at opposite side portions of the finishing float 198 as indicated in FIGURE 24, and are constructed to effect vertical vibration of such float. The vibrators 222 and 223 are connected to a rigid bar 224 which is welded to the upper surface of the float 198 and prevents the same from flexing substantially. Vibrators 222 and 223 may be pneumatically operated, and are adapted to effect high-frequency, low-force, low-amplitude vibration of the finishing float 198. Thus, for example, float 198 may be vibrated at a frequency on the order of about 23,000 cycles per minute, the amplitude of vibration being only about (for example) 0.010 inch to 0.020 inch. Such a high-frequency, low-amplitude vibration brings the grout to the surface and causes the finishing float 198 to smooth over the concrete hump 204 (FIGURE 24) so that substantially all traces of the groove 201 and of the tape are eliminated.

The two individually-controlled vibrations are important to the proper operation of the apparatus. The tape blade or head 158 is vibrated (as stated above) with a high-impact, high-amplitude vibration but at a relatively low frequency, the frequency being sufficiently low that a minimum amount of grout is formed and allowed to flow into the groove 201 (FIGURE 24) resulting from passage of the head or blade through the concrete. On the other hand, the finishing float 198 operates on surface grout only and is therefore vibrated at a high frequency but with low impact and amplitude. The purpose of the finish float is to restore the concrete surface to substantially the original condition which was present prior to tape insertion. The chevron trowels 196 and 197 are not vibrated, so that the groove 201 is filled with concrete which is relatively unchanged in texture, composition and strength.

*Detailed description of a means to sever the longitudinal joint strip in the concrete highway*

It is conventional in laying a concrete highway to include therein a plastic joint strip which extends longitudinally of the highway at the center thereof. Such a strip is indicated at 226 in FIGURE 17 and is, as previously stated, normally relatively thin, flexible and elastic.

To cut cleanly through the strip 226 without forcing the same downwardly into the concrete 11, bending it over or providing other undesired effects, the invention provides on the blade or head 158 a point element, comprising an elongated dowel 227 oriented parallel to the direction of blade motion and adapted to penetrate strip or tape 226 at a region spaced a substantial distance beneath the surface of the highway.

The illustrated strip or tape 226 is two inches wide, and the dowel 227 is shown as engaging the same at a distance spaced one inch beneath the surface of the concrete. Because of the substantial downward spacing of the dowel, there is sufficient aggregate adjacent the upper portion of the strip 226 that it will be bent over in response to pressure exerted by the dowel. Instead, the dowel will penetrate the tape 226 and prepare the same for complete cutting by a blade 228 having cutting edges 229 (FIGURES 17 and 19). The dowel 227 and blade 228 are omitted from FIGURE 23.

Stated more definitely, the dowel 227 is a cylinder having a conical point, and is welded or otherwise suitably secured at the front end of the metal blade or keel element 228. Blade 228 is, in turn, welded to the lower edge 162 of head 158. Such blade or keel lies in the vertical plane of the portion of tape 150 which has been inserted into the concrete, and is preferably approximately ⅛ inch thick. The forward edges 229 of the blade or keel 228 are inclined (forwardly convergent) as illustrated, in order to augment the cutting action. The dowel may be about ¼ inch in diameter.

The described apparatus cuts the tape or strip 226 cleanly and effectively, and is aided by the vibration action described relative to vibrator 220 (FIGURE 20). The dowel 227 and blade 228 are relatively immune to loss of effectiveness as a result of the highly abrasive action of the concrete. Furthermore, the indicated dowel 227 and blade 228 have been found to provide little or no increased resistance to passage of the blade or head 158 through the concrete.

Once the strip 226 has been cut as described, the transverse strip or tape 150 deposited in accordance with the present invention may pass between the severed ends of strip 226 and thus create four corner joints or regions where cracking will occur from curing of the concrete.

As best shown in FIGURE 19, the sensing shoe 174 should be cut out in a region 232 above the dowel 227. This is because such dowel creates some swelling of the concrete immediately in advance of the blade or head 158, which swelling may cause elevation of the shoe 174 and consequent spurious upward actuation. With the cutout 232, however, there is no such spurious actuation since the indicated swelling is not sensed by shoe 174.

*Description of the second embodiment of the cutoff and holding means for the tape ("feature (f)" specified in the Abstract of the Disclosure)*

Referring particularly to FIGURES 24 and 26, the present embodiment of the invention provides a cutoff blade 234 which is located immediately to the rear of the discharge end 167 of head or blade 158. Blade 234, which is adapted to move vertically, is connected by a rod 235 to the piston 236 in a double-acting cylinder 237, the latter being rigidly mounted on support plate 39a.

Cylinder 237 may be supplied with air or other suitable fluid through hoses, not shown, and under the control of suitable manually or automatically operated valve means. Such valve means may, for example, be operated by an element in the nature of the actuator 143 illustarted at the right end of FIGURE 2, the actuator being so located that cutoff will occur as soon as the trailing or discharge end 167 of head 158 moves laterally out of the vertical side or edge of the concrete highway.

Blade 234 has a recessed, chevron-shaped lower cutting edge adapted upon downward shifting of the blade to cut cleanly through the tape 150. It is a feature of the cutting means that the blade 234 is located sufficiently close to head end 167 that the latter secures the tape both during the cutting operation and during return traverse of the carriage and head across the highway. Thus, the need for the clamping operation described in connection with the previous embodiment of the cutting and holding apparatus is eliminated.

Because of inertia and other factors, the feeding of tape 150 does not cease immediately after the tape is cut. Accordingly, the continued feeding of the tape against the downwardly-shifted blade 234 would tend to create the following two undesired results: (a) the tape would jam against the side of the blade, and (b) there would be an excessively long "tail" of tape which would project an undesired distance from the blade end 167 and would also project from the inlet (traverse-beginning) side of the concrete highway.

To prevent both of the above undesired effects, blade 234 is constructed with an opening 240 which is sufficiently large to receive the tape 150 when the blade is in its lowermost position. In addition, the portion of the blade defining the lower end of opening 240 comprises a second chevron-shaped cutting edge 241 which cuts off the "tail" of tape after the initial cutting operation and during upward travel of the blade 234 to the position shown in solid lines in FIGURE 26.

To summarize the operation of the cutting apparatus, the blade 234 is shifted downwardly as soon as the discharge end 167 of the head emerges from the concrete at the end of a strip-insertion traverse. This is preferably so timed that the tape is cut off adjacent the vertical edge of the concrete at the side of the roadway. Feeding of the tape 150 then continues, due to inertial and other effects, so that the tape passes through the opening 240 as shown in phantom lines at the lower portion of FIGURE 26.

As soon as tape feed stops completely, cylinder 237 is operated to raise the blade 234 to the solid-line position, so that the second cutting edge 241 cuts off the tail.

The very short portion of the tape 150 which is then present between discharge end 167 and the plane of blade 234 is insufficiently long that wind and other effects will move it substantially. Therefore, the discharge end 167 of the head serves as the holding means maintaining the precise position of the tape during return traverse of the apparatus over the concrete.

As one example, the plane of blade 234 may be located approximately ⅜ inch from the extreme trailing end of outlet portion 167 of head 158. Suitable means (not shown) are provided to prevent rotation of the blade 234, about a vertical axis, away from its position in a plane perpendicular to the plane of the injected tape.

*Summary of the method and operation, second embodiment (FIGURES 17–27)*

Let it be assumed that the carriage 32a is initially adjacent the end of beam or track 12 which is above the inlet edge of the concrete highway 11 (at the left side of FIGURE 2, which figure shows the first embodiment). As the master link 56 (FIGURE 4) of the Scotch-yoke mechanism 48 moves downwardly around the drive sprocket 60, the sensing shoe 174 drops slowly onto the extreme edge of the highway. When the master link 56 is in its lowermost position, the sensing shoe 174 and the associated pneumatic apparatus 43a, etc. (FIGURE 25) become the sole means for determining the elevation of the head or blade 158 relative to the surface of the concrete 11.

A detailed description of this height-controlling function effected by cylinder 43a under the control of the valves 186 and 187 (FIGURE 21), which in turn are controlled by shoe 174, is given above. Normally, the adjustment is caused to be such that the upper edge of tape or strip 150 is flush with the highway surface. However, upward or downward variations in the elevation of such edge can be effected.

Motion of master link 56 (FIGURE 4) to the right (with the lower run of chain 54) causes the head or blade 158 and associated apparatus to travel across the highway in the strip-insertion traverse. During such traverse, the uncorrugated tape 150 is fed into and through the blade or head 158 at a rate which corresponds to the rate of movement of such blade relative to the concrete. Accordingly, the tape 150 emerging from the discharge end 167 of blade 158 will not move relative to the concrete 11, so that there is no need for anchoring the tape in the concrete or adjacent the concrete and, furthermore, there is no creep after the tape is introduced. The feeding of the tape or strip is effected, as in the previous embodiment, by the stationary chain 76 (FIGURE 5) which causes rotation of sprocket 77 to operate the drive 78 which is connected to drive wheel 154 (FIGURE 22).

In passing through the blade or head 158, the uncorrugated tape 150 is caused to turn the corner in a generally vertical plane as described in detail relative to FIGURES 23 and 27. As was there described, the head 158 which effects such turning is particularly adapted to move rapidly through the concrete with a minimum of disturbance thereof.

The chevron trowels 196 and 197 effectively fill in the groove 201 (FIGURE 24) caused by traverse of the blade 158 therethrough, and the finishing float 198 effectively finishes over the concrete to restore the surface of the highway to substantially its original condition. As described in detail above, head 158 is vertically vibrated (vibrator 220) at a predetermined frequency and amplitude, and finishing float 198 is vibrated (vibrators 222 and 223) at a predetermined different frequency and amplitude, the chevron trowels 196 and 197 being maintained substantially free of vibrations so that the concrete will maintain its original consistency.

As the apparatus approaches the edge of the highway at the end of a strip-insertion traverse, shoe 174 falls off such edge. Substantially simultaneously, the valve 194 (FIGURE 25) is closed to insure that the blade 158 will not move downwardly into the concrete as the result of dropping of shoe 174.

Forward progress of the apparatus continues until the trailing or discharge end 167 of blade 158 emerges from the edge of the concrete, whereupon the cutoff blade 234 is operated to cut off the tape as described in detail relative to FIGURE 26. As soon as all feeding operation ceases, blade 234 is actuated upwardly to cut off a remaining tail of tape, which tail projected through blade opening 240.

The head or blade 158 is then lifted by master link 56 as the latter moves upwardly around the idler sprocket 61 (FIGURE 1) adjacent the edge of the highway. The entire carriage is then moved backwardly across the highway at an elevation sufficiently high that the blade 158 and all other apparatus are out of contact with the highway surface. Suitable valve means, not shown, may be provided to operate the pneumatic cylinder 43a (FIGURE 25) during this return traverse across the highway in order to assist the Scotch-yoke mechanism 48 in lifting the head and maintaining it lifted. As previously described in detail relative to FIGURE 12, there is no feeding of tape in either direction during this return traverse.

The previously-introduced longitudinal center strip 226 (FIGURE 17), which is provided in many concrete highways during forming thereof, is cut by the elements 227 and 228 as discussed in detail relative to FIGURE 17. This permits the transverse tape or strip 150 to penetrate through the longitudinal tape or strip 226 without bending-over or damage to the latter except at the region of cutting.

Where a second strip of highway is being laid adjacent a previously-poured strip, the above operation is changed in the following manner. Instead of dropping down adjacent the inlet side of the concrete highway, the orientation is caused to be such that the trailing end 167 of the blade 158 moves vertically downwardly closely adjacent the previously-cured strip. In other words, the head 158 is caused to enter downwardly into the concrete instead of entering horizontally therein as discussed above. Because of the small clearance gaps around the tape at the discharge end 167 of blade 158, no substantial amount of grout then enters the rear end of the blade 158 (which grout would otherwise effect wear and binding of the tape).

The second embodiment (FIGURES 17-27) has been described as being of the start-stop type, the prime mover E (FIGURE 1) remaining stationary during each strip-insertion traverse of the carriage 32a. To make the second embodiment of the continuous motion type, the following changes are made: (a) blade 158 is disposed in a vertical plane lying at an acute angle to a vertical plane containing track 12, the angle being determined by vector addition as described in detail relative to the first embodiment and FIGURE 16 thereof, and (b) the rate of tape feed is made equal to the resultant speed of the carriage 32a, also as described relative to the first embodiment.

Throughout the specification and claims, the word "horizontal" is employed to mean parallel to the surface of the concrete. "Vertical plane" denotes a plane perpendicular to the surface of the concrete. In other words, the specification and claims are (for convenience) written in terms of a concrete slab having a horizontal surface, it being well understood that many slabs are inclined.

It is desired that the joint tape or strip, when embedded in the concrete, lie in a vertical plane (as defined in the preceding paragraph) since the possibility of spalling is then minimized. However, a certain amount of leeway or tolerance is permitted by some highway departments. The appended claims should not be regarded as avoided by an apparatus or method which deviates from optimum and causes the embedded tape to be inclined at an angle to a vertical plane.

The foregoing detailed description is to be clearly understood as given by way of illustration and example only, the spirit and scope of this invention being limited solely by the appended claims.

I claim:

1. Apparatus for inserting transverse joint means into plastic concrete, which comprises:
   bridge means adapted to span across a highway formed of plastic concrete,
      said bridge means including supporting portions located on opposite sides of said highway,
      said bridge means further including an elongated track portion adapted to be spanned across said highway,
   a carriage movably mounted on said track portion for traversal of said highway,
      said carriage including an insertion heated adapted to be at least partially immersed in said concrete and to insert a joint means therein,
   means to effect movement of said bridge means longitudinally of said highway, and
   means to effect movement of said carriage transversely of said highway simultaneously with said movement of said bridge means longitudinally thereof and at a predetermined speed relative to the speed of said longitudinal movement,
      said means to effect movement of said carriage effecting said movement at such speed and in such direction that said head moves horizontally through said concrete along a predetermined line and in the absence of concrete-plowing movement in a horizontal direction transverse to said line.

2. The invention as claimed in claim 1, in which said line is straight, in which said head is horizontally elongated in the direction of said predetermined line, and in which said head has only a small dimension perpendicular to a vertical plane containing said line whereby only a narrow groove is made by said head in moving through said concrete along said line.

3. The invention as claimed in claim 2, in which a vertical plane containing said head lies at an acute angle to a vertical plane containing the axis of said track portion of said bridge means.

4. The invention as claimed in claim 1, in which said means to effect said simultaneous longitudinal and transverse movements includes means to maintain fixed the speed of said bridge means longitudinally of said highway relative to the speed of said carriage transversely thereof.

5. The invention as claimed in claim 4, in which said head is horizontally elongated, and in which a vertical plane containing said head is parallel to the resultant obtained by taking the vector sum of the speed of said bridge means longitudinally of said highway and the speed of said carriage transversely thereof.

6. Apparatus for inserting a solid joint strip into plastic concrete, which comprises:
   a strip-inserter head adapted to move horizontally through a slab of plastic concrete to insert a joint strip therein,
   actuating means to move said head horizontally through said concrete in a particular direction, and
   feeding means associated with said head and movable therewith to feed a solid joint strip through said head into said concrete in a direction opposite to said particular direction and at a rate which is substantially equal to the speed of movement of said head through said concrete,
      whereby said joint strip emanating from said head does not move relative to said concrete and becomes embedded therein.

7. The invention as claimed in claim 6, in which means are provided to vibrate said head to facilitate movement thereof through said concrete, and to insure achievement of continuous contact between said joint strip and the concrete mass in which it is embedded.

8. Apparatus for inserting transverse joint means into plastic concrete, which comprises:
   support means adapted to span across a highway formed of plastic concrete,
   an insertion head movably mounted on said support means and adapted to be at least partially immersed in said concrete to insert a joint means therein, and
   means to effect movement of said support means longitudinally of said highway and movement of said head transversely of said highway,
      said last-named means effecting said longitudinal and transverse movements simultaneously in timed relationship to each other and in such manner and in such relative directions that said head moves through said concrete along a predetermined line parallel to the surface of said concrete and in the absence of concrete-plowing movement in a horizontal direction transverse to said line.

9. The combination of:
   an elongated flexible pre-corrugated joint strip,
      said joint strip being corrugated in such manner that the corrugations extend generally perpendicular to the longitudinal axis of the strip, with an
   apparatus for feeding said strip into a mass of plastic concrete,
      said apparatus including an elongated head having an inlet end portion disposed above the upper surface of said mass,
         said head also having an outlet end portion disposed in said mass beneath the upper surface thereof,
         said head also having an intermediate portion extending between said inlet and outlet end portions and inclined at an acute angle to said upper surface,
      said apparatus also including means to move said head horizontally along a predetermined path where a joint strip is desired,
      said apparatus further including power-operated drive means movable with said head to push said strip into and through said head at a speed equal to and in opposite direction from the speed and direction of said horizontal movement of said head.

10. Apparatus for forming transverse joints in concrete highways, which comprises:
   a strip-insertion head adapted to insert a joint strip into a mass of plastic concrete in a highway,
   means to move said head transversely between opposite edges of said highway whereby to insert said strip into said highway and form a transverse joint therein,
   a strip-storage means adapted to store a length of joint strip many times longer than the length of any transverse joint in said highway,
   power-operated means to feed said joint strip from said strip-storage means to said strip-insertion head and to pass said joint strip through said head and into said highway,
   means to effect cut-off of said strip adjacent the edge of said highway, and
   power means to operate said cutting means.

11. Apparatus for inserting a joint strip transversely of a highway of plastic concrete, which comprises:
   track means spanned horizontally across said highway,
   a strip-insertion head adapted to move back and forth along said track means between opposite edge portions of said highway,
      said head being adapted to insert a joint strip into said highway during traversal across said highway in a direction from one edge portion of said highway to the other edge portion thereof,
   means to actuate said head back and forth along said track means between said opposite edge portions,
      said actuating means causing said head to emerge in a substantially horizontal direction from said other edge portion of said highway,
   means to change the elevation of said head,
      said last-named means comprising means to maintain at least a portion of said head below the upper surface of the concrete during travel of said head from said one edge portion of said highway to said other edge portion thereof,
      said last-named means further comprising means to maintain said head spaced above said upper concrete surface during travel of said head from said other highway edge portion to said one highway edge portion, and
   slip form means provided at least said other edge portion of said highway to prevent damage thereto by said head,
      said slip form means having a gap therein to permit passage of said head therethrough as it emerges from said other edge portion.

12. Apparatus for inserting a solid joint strip into plastic concrete, which comprises:
   track means spanned across a mass of plastic concrete into which strip is to be inserted,
   a head adapted to be at least partially immersed in said concrete and to insert a solid joint strip therein,
   means to support said head from said track means and to effect traverse of said head along said track means and horizontally through said concrete, and
   means to feed a solid joint strip to and through said head, said strip-feeding means including:
      a stationary drive element fixedly provided longitudinally of said track means whereby it does not move relative to said track means,
      a rotatable drive element drivingly engaged with said stationary drive element and adapted to move longitudinally of said track means with said head, and
      means to connect said rotatable drive element with a strip-feeding element,
   said rotatable drive element and said connecting means being adapted in response to movement of said rotatable drive element along said stationary drive element to effect said feeding of joint strip through said head by said strip feeding element at a rate equal to the rate of movement of said head through said concrete, and in a direction opposite to the direction of movement of said head through said concrete.

13. The invention as claimed in claim 12, in which the connection between said rotatable drive element and said connecting means includes a one-way clutch whereby feeding of said joint strip is effected during traverse of said head in one direction only, and not in the reverse direction.

14. Apparatus for inserting a joint strip transversely of a concrete highway and thereby forming a transverse joint therein, which comprises:
   a bridge apparatus adapted to span a portion of the highway wherein the concrete is in plastic condition,
      said bridge apparatus including moving support portions disposed on each side of the highway and a track or span portion spanned across said highway,
   a carriage movably mounted on said track portion for traverse across said highway,
   means to effect movement of said support portions longitudinally of said highway,
   means to effect movement of said carriage along said track portion,
   an elongated strip-insertion head,
   means to mount said head on said carriage for vertical movement relative to said carriage between a first elevation at which at least a portion of said head is immersed in the concrete and a second elevation at which all of said head is elevated above the upper surface of the concrete, storage means for a long section of solid joint strip, and means to feed joint strip from said storage means to and through said head when said head is at first elevation and in timed relationship to the rate of traverse of said head through the concrete, said last-named means being such that the feeding of joint strip from the strip-insertion head is in a direction substantially opposite to the direction of traverse of said head through the concrete, and is at a rate substantially equal to the rate of traverse of said head through the concrete.

15. The invention as claimed in claim 14, in which means are provided to cut off said joint strip at the completion of a strip-insertion traverse through the concrete.

16. The invention as claimed in claim 14, in which said strip-storage means is a reel, and in which means are provided to effect braking of said reel at the completion of each strip-insertion traverse of said head.

17. The invention as claimed in claim 14, in which slip-form means are provided on said bridge apparatus adjacent at least one edge of said highway and in engagement with the vertical surface of such edge, at least part of said slip-form means being adapted to permit passage of said head therethrough.

18. Apparatus for inserting joint strip into a plastic region of a concrete highway, which comprises:

first and second trucks disposed, respectively, on opposite sides of a highway, a beam connected between said trucks and spanning said highway, a continuous drive chain mounted around vertically-oriented sprockets at opposite ends of said beam whereby upper and lower runs are formed, means to effect driving of said chain at a predetermined rate of speed, a carriage mounted on said beam for movement therealong, a strip-insertion head connected to said carriage and adapted to move vertically relative thereto, means to connect said chain to said strip-insertion head whereby to effect longitudinal movement of said carriage along said beam and also to effect vertical movement of said head in response to the one of said upper and lower runs to which said head is connected, means to effect vibration of said head, a strip-storing drum mounted rotatably on said carriage, strip-feeding means to feed joint strip from said drum to and through said head and at a speed substantially equal to the speed of traverse of said head through the concrete and in a direction opposite to the direction of such traverse, said strip-feeding means operating only during traverse of said head when connected to the lower one of said chain runs, and means to cut off said strip upon completion of a strip-insertion traverse of said head.

19. Apparatus for inserting an elongated flexible uncorrugated solid joint strip into plastic concrete, which comprises:

a strip-insertion head adapted to be at least partially immersed in plastic concrete to insert an elongated flexible uncorrugated solid joint strip therein, said head having an inlet portion adapted to receive said strip when the axis of said strip is in a downwardly-inclined orientation, said head having an outlet portion adapted to discharge said strip with the axis thereof in a generally horizontal orientation and with the discharging and discharged strip lying in a generally vertical plane, said head having an intermediate portion adapted to conduct said strip from said inlet portion to said outlet portion and to change the orientation of said axis from downwardly-inclined to generally horizontal, said intermediate portion including means to corrugate at least a portion of said strip in situ and in such manner that the axes of the corrugations thus formed in said strip are transverse to said strip axis, and means to move said head horizontally through said concrete along a predetermined path.

20. The invention as claimed in claim 19, in which said corrugation means effects corrugation of at least a substantial portion of one edge of said strip and does not corrugate the other edge thereof.

21. The invention as claimed in claim 20, in which said one edge is the upper edge of the strip section disposed within said intermediate portion of said head.

22. The invention as claimed in claim 19, in which power-operated means are provided adjacent said inlet portion of said head to effect feeding of said strip through said head in a direction from said inlet portion to said outlet portion, and in which said power-operated means effects discharge of said strip from said outlet portion at a rate equal to and in a direction substantially opposite from, respectively, the rate and direction of movement of said outlet portion through said concrete.

23. The invention as claimed in claim 19, in which power-operated means are provided to vibrate said head during movement thereof through said concrete.

24. Apparatus for inserting an elongated flexible uncorrugated solid joint strip into plastic concrete, which comprises:

an elongated strip-insertion head disposed generally in a vertical plane, said head having an inlet end portion adapted to receive said strip when the axis of said strip is in a downwardly-inclined orientation, said head having an outlet end portion adapted to discharge said strip when the axis of said strip is in a generally horizontal orientation, said head also having an intermediate portion between said inlet and outlet end portions and adapted to change the orientation of said axis from downwardly-inclined to generally horizontal, said intermediate portion incorporating guide means to scallop at least part of the upper edge of said strip in situ to thereby cause said change in the orientation of said axis, and means to move said head through said concrete along a line lying generally in said vertical plane of said head, with said inlet end portion disposed in advance of said outlet end portion and above the surface of said concrete, and with at least a large part of said outlet end portion disposed beneath the surface of said concrete.

25. The invention as claimed in claim 24, in which guide means are provided in said outlet end portion of said head to maintain said strip in unscalloped condition when discharging from said head into said concrete.

26. The invention as claimed in claim 24, in which said intermediate portion of said head includes guide means to maintain the lower edge of said strip in unscalloped condition and in said vertical plane, and in which the lower edge of said head is relatively sharp and closely proximate and parallel to said lower edge of said strip whereby to knife effectively through said concrete with minimum disturbance thereof.

27. The invention as claimed in claim 24, in which the exterior side surfaces of said head are scalloped correspondingly to the scallops provided in said strip by said head.

28. The invention as claimed in claim 24, in which power-driven feed means are provided for force-feeding said strip through said head, and in which means are provided to mount said feed means adjacent said head for movement therewith.

29. The invention as claimed in claim 28, in which said feed means are mounted adjacent said inlet end portion of said head.

30. The invention as claimed in claim 28, in which said feed means effects discharge of said strip from said outlet end portion of said head at a rate substantially equal to the rate of movement of said outlet end portion through said concrete, and in a direction substantially opposite from the direction of movement of said outlet end portion through said concrete, whereby to prevent substantial movement of said strip relative to said concrete after discharge of said strip from said head.

31. An apparatus for inserting into a slab of plastic concrete an uncorrugated joint strip adapted to create a plane of weakness with consequent formation of a crack beneath the strip upon curing of the concrete, which comprises:
an elongated head having an elongated passage therethrough adapted to transmit said strip downwardly to an elevation generally beneath the surface of the concrete and to discharge said strip in a generally vertical plane but with the axis of said strip generally horizontal,
said passage having opposed generally parallel side walls spaced a short distance from each other and permitting free passage of said strip therebetween with portions of each side wall guiding portions of each side of said strip,
a substantial length of each of said side walls being shaped generally as a plurality of sections of cones the apex regions of which are in the vicinity of spaced points along the lower region of said passage, whereby the upper portions of side walls along said lengths thereof are scalloped and whereby the lower regions of said side walls along said lengths thereof are not scalloped, thus causing corresponding partial scalloping of said strip in situ during passage between said lengths,
means to move said head along a predetermined line generally in said vertical plane and with the inlet end of said passage leading the outlet end thereof,
said inlet end being above the surface of the concrete whereas said outlet end is generally beneath said surface, and
means to feed said strip from a source thereof to and through said passage and thence out said outlet end into the concrete.

32. The invention as claimed in claim 31, in which said passage has a closed bottom wall lying substantially in said vertical plane, said bottom wall being arcuate about a center point located a substantial distance above said head.

33. The invention as claimed in claim 31, in which said outlet end of said passage is elongated, straight and defined by unscalloped wall portions, thus permitting any stresses in said strip to be removed prior to discharge of said strip from said head.

34. The invention as claimed in claim 31, in which said outlet end of said passage is defined by wall portions disposed closely adjacent said strip, thus preventing ingress of grout into said outlet end.

35. The invention as claimed in claim 31, in which feed means are mounted for movement with said head and are adapted to push said strip into said inlet end of said passage, the rate of pushing of said strip being substantially equal to the rate of movement of said head along said predetermined line.

36. The invention as claimed in claim 31, in which said head is formed of sheet metal having a generally uniform wall thickness outwardly of said passage side walls, whereby the shapes of the side walls of said passage are duplicated on the exterior side walls of said head, the bottom edge of said head being closed to prevent ingress of grout into said passage.

37. The invention as claimed in claim 36, in which said bottom edge of said head is relatively sharp and is close to the lower edge of said strip.

38. The invention as claimed in claim 36, in which alternate conic sections formed along the exterior side walls of said head are exteriorly concave, and the remaining alternate conic sections formed along said exterior head side walls are exteriorly convex.

39. The invention as claimed in claim 31, in which means are provided to effect generally vertical vibration of said head with a relatively high amplitude and force and at a relatively low freqeuncy.

40. A method of forming a joint in a slab of concrete, which comprises:
moving a vertically-oriented and downwardly-inclined strip-insertion guide at a predetermined rate and in a predetermined forward direction horizontally through the upper regions of a slab of plastic concrete,
said predetermined forward direction being such that the lower end of said guide trails behind the upper end thereof,
said guide containing a portion of an elongated solid joint strip adapted to form a joint in said slab,
drivingly contacting said joint strip at a region adjacent said guide to push said joint strip in a rearward direction opposite to said predetermined forward direction, and at a rate relative to said guide which is equal to said predetermined rate,
thereby preventing substantial relative movement between said slab and the portion of said joint strip which has passed out of said guide whereby such last-mentioned portion becomes embedded in said slab,
said embedded portion of said joint strip being oriented in a vertical plane but with the axis of said embedded portion horizontal, and
continuously vibrating said guide to aid in displacing the aggregates in said slab and to aid in the embedding of said joint strip in said slab.

41. A method of introducing a joint tape into a slab of plastic concrete, which compirsings:
providing a length of flexible tape which does not have transverse corrugations,
progressively feeding said tape downwardly into a slab of plastic concrete in such orientation that a section of tape above the upper surface of said slab lies in a plane which is generally perpendicular to said upper surface, and also in such orientation that the axis of said above-surface tape section is inclined at an acute angle to said upper surface,
progressively transversely corrugating or scalloping at least the upper edge of a portion of said tape in situ at a region adjacent said upper surface and in an amount sufficient to bend said tape portion until the axis of a tape section which is below said upper surface is generally parallel to said upper surface,
said below-surface tape section lying in a plane which is generally prependicular to said upper surface,
progressively straightening or uncorrugating the transversely-corrugated or scalloped tape portion to form said below-surface tape section, and
embedding said below-surface tape section in said slab while maintaining the axis thereof parallel to said upper surface, and while maintaining said below-surface tape section in a plane which is generally perpendicular to said upper surface.

42. The invention as claimed in claim 41, in which said method further compirses effecting said tape introduction by moving a tape-insertion head through said slab in a forward direction and at a predetermined speed, and pushing said tape through said head in a rearward direction and at said predetermined speed relative to said head whereby to effect substantially zero relative movement between said slab and the tape inserted therein.

43. A method of introducing a joint tape into a slab of plastic concrete, which comprises:
   providing a length of flexible tape which does not have transverse corrugations, and which is sufficiently thick to resist longitudinal compression,
   feeding said tape toward the upper surface of a slab of plastic concrete in such orientation that a section of tape above said surface lies in a plane which is transverse to said upper surface, and also in such orientation that the axis of said above-surface tape section is inclined at an acute angle to said upper surface, and
   introducing said tape progressively into said slab while causing a substantial length along the upper edge of said tape to move laterally to opposite sides of said plane and also generally parallel to said plne, nd plane and also generally parallel to said plane and, while causing the corresponding length along the lower edge of said tape to remain in said plane and follow an arcuate path therein,
     thereby changing the inclination of the tape axis until the axis of the tape section which is introduced in said slab is generally parallel to said upper surface, said introduced tape section lying generally in said plane.

44. The invention as claimed in claim 43, in which said method further comprises causing the path followed by the extreme upper edge of said tape along said length thereof to be generally sinusoidal, and causing the amplitude of the sinusoidal path on opposite sides of said plane to decrease progressively toward said lower edge, and in which said method additionally comprises moving a tape-insertion head through said slab in a forward direction and at a predetermined speed, and pushing said tape through said head in a rearward direction and at said predetermined speed relative to said head whereby to effect substantially zero relative movement between said slab and the tape inserted therein, said pushing being effected by drivingly engaging said tape adjacent the inlet region of said head.

45. Apparatus for introducing a joint strip into a slab of plastic concrete, which comprises:
   a head adapted to move through the slab and to inject joint strip therein,
   means to move said head along said slab during said injection of joint strip therein, and
   means to control the elevation of said head relative to the elevation of the surface of said slab during said movement of said head through said slab, whereby to determine the depth of injection of said joint strip into said slab,
     said control means including a sensing element adapted to contact the upper surface of said slab in the vicinity of said head,
     said control means further including means responsive to said sensing element to change the elevation of said head with respect to said upper surface of said slab.

46. The invention as claimed in claim 45, in which said means responsive to said sensing element to change the elevation of said head comprises double-acting pneumatic cylinder means to raise and lower said head, means to supply pressurized air simultaneously to both ends of said pneumatic cylinder means and at predetermined air pressures, and means responsive to said sensing element to effect controlled bleeding of air from selected ends of said pneumatic cylinder means.

47. The invention as claimed in claim 46, in which said sensing element comprises a large-area sensing shoe disposed in advance of said head during movement of said head through said slab and adapted to be in low-pressure contact with the upper surface of said slab, and in which bleed-valve means are operably associated with said shoe for selective opening and closing in accordance with the elevation of said upper slab surface, said bleed-valve means being connected to said pneumatic cylinder means to effect selective bleeding of air therefrom.

48. The invention as claimed in claim 47, in which said bleed-valve means is preloaded whereby to operate in a sensitive manner and to prevent hunting.

49. Apparatus for injecting a joint strip into a slab of plastic concrete, which comprises:
   a head adapted to move through said slab and to inject a joint strip therein,
   mounting means to support said head,
   means to move said mounting means and said head along the upper surface of said slab during a strip-insertion operation, and
   finishing means mounted on said mounting means and disposed to the rear of said head during a strip-insertion traverse,
     said finishing means comprising trowel means to fill in the groove formed in said slab by said head,
     said finishing means further comprising a finishing float mounted to the rear of said trowel means to finish over the surface of said slab after operation thereon by said trowel means.

50. The invention as claimed in claim 49, in which said trowel means comprises a first trowel element disposed generally on one side of said groove to move concrete into said groove from said one side, and a second trowel element disposed generally on the other side of said groove to move concrete into said groove from said other side.

51. The invention as claimed in claim 49, in which means are provided to effect relatively high-frequency, low-amplitude vibration of said finishing float to bring the grout to the surface thereat, and in which means are provided to substantially isolate said trowel means from vibration whereby to prevent breakdown and change in the composition of the concrete engaged by said trowel means.

52. The invention as claimed in claim 49, in which sensing means are mounted on said mounting means and are adapted to sense the elevation of the upper surface of said slab in advance of said head, and in which means responsive to the elevation of said sensing means relative to said mounting means are provided to determine the elevation of said trowel means and finishing float relative to said mounting means.

53. Apparatus for laying joint strip from a continuous source thereof in order to form transverse joints in a concrete highway prior to curing of the concrete, said apparatus comprising:
   a strip-insertion head adapted to be moved horizontally through the highway and to inject transverse joint strip therein,
     said head having a discharge end disposed generally beneath the surface of the concrete during strip-insertion movement of said head through the concrete,
   means to move said head through the concrete and to effect discharge of joint strip therefrom whereby to lay the joint strip in the concrete, and
   means to cut off said joint strip at the end of a strip-insertion traverse,
     said cut-off means comprising a cut-off blade mounted adjacent said discharge end of said head and incorporating cutting means disposed for severing contact with a portion of the strip which emerged from said discharge end, said cut-off means further comprising power means to effect operation of said blade to sever said strip adjacent said discharge end, whereby said head operates to maintain said strip in position during return traverse of said head across said highway preparatory to initiation of another strip-insertion traverse through said highway.

54. The invention as claimed in claim 53, in which said cut-off blade has a recess or opening therein, said recess being disposed to receive said strip subsequent to an initial strip-cutting operation, and in which second cutting means are provided on said blade adjacent said recess, said second cutting means being disposed to cut off said strip during return movement of said blade subsequent to an initial strip-cutting operation, whereby said strip passing through said recess as a result of inertia and other factors is cut off by said second cutting means during return movement of said blade.

55. Apparatus for depositing transverse joint tape in the upper regions of a concrete highway or the like prior to curing of the concrete, said apparatus comprising:

truck means mounted on opposite sides of said highway for movement therealong, track means having end portions supported on said truck means at opposite sides of said highway whereby said track means is spanned across said highway in spaced relationship above the upper surface of the concrete, a carriage mounted on said track means for movement therealong back and forth across said highway, a storage means to store a long length of uncorrugated plastic tape, an elongated tape-insertion blade adapted to move through the concrete, said blade having a tape passage therethrough, the walls of said tape passage being adapted to corrugate or scallop the tape in situ during passage of said tape through said tape blade whereby to effect bending of said tape around a corner and in a plane which is generally perpendicular to the upper surface of the concrete, means to suspend said blade from said carriage in such manner that said blade may move vertically relative to said carriage, means to move said carriage along said track means during a strip-insertion traverse and to maintain said blade at least partially immersed in the concrete, means to move said carriage in the opposite direction across said highway during a return traverse and with said blade at an elevation above said upper surface of the concrete, means to feed tape from said storage means to said blade and to effect discharge of said tape from said blade during a strip-insertion traverse of said blade through the concrete, said feeding means including power-operated feed rollers disposed adjacent the inlet end of said blade, said feeding means further including means to effect operation of said feed rollers in timed relationship to the rate of movement of said carriage along said track means and at such a rate that said tape discharges from said blade at a rate equal to the rate of movement of said blade through the concrete and in a direction opposite to the direction of movement of said blade through the concrete, sensing means supported on said carriage and adapted to sense the upper surface of the concrete at a point in the general vicinity of said blade, control means responsive to said sensing means to determine the elevation of said blade relative to said carriage during a strip-insertion traverse of said blade through the concrete whereby to determine the elevation of said blade relative to said upper concrete surface, and means supported by said carriage at a region to the rear of said blade during a strip-insertion traverse to trowel into the groove formed in the concrete by said blade sufficient concrete to at least fill said groove.

56. The invention as claimed in claim 55, in which cut-off means are provided adjacent said blade to cut off said tape at the end of a strip-insertion traverse.

57. The invention as claimed in claim 55, in which slip form means are provided adjacent at least one edge of said highway to prevent damage to said edge during emergence of said blade therefrom.

References Cited

UNITED STATES PATENTS

| 3,194,130 | 7/1965 | Guntert | 94—45 |
| 3,269,282 | 8/1966 | Beesley et al. | 94—39 |

JACOB L. NACKENOFF, *Primary Examiner.*

UNITED STATES PATENT OFFICE
CERTIFICATE OF CORRECTION

Patent No. 3,413,901                                  December 3, 1968

Arthur I. Lusk

It is certified that error appears in the above identified patent and that said Letters Patent are hereby corrected as shown below:

Column 34, line 19, "heated" should read -- head --. Column 36, line 19, after "provided" insert -- at --. Column 37, line 8, after "at" insert -- said --. Column 41, line 24, "plne, nd" should read -- plane, and --; line 25, cancel "plane and also generally parallel to said plane and,".

Signed and sealed this 24th day of March 1970.

(SEAL)
Attest:

Edward M. Fletcher, Jr.
Attesting Officer

WILLIAM E. SCHUYLER, JR.
Commissioner of Patents